United States Patent
Yoshida

(10) Patent No.: US 8,391,670 B2
(45) Date of Patent: Mar. 5, 2013

(54) RECORDING APPARATUS, RECORDING METHOD, AND COMPUTER PROGRAM

(75) Inventor: Kenji Yoshida, Kanagawa (JP)

(73) Assignee: Sony Corporation, Tokyo (JP)

( * ) Notice: Subject to any disclaimer, the term of this patent is extended or adjusted under 35 U.S.C. 154(b) by 1159 days.

(21) Appl. No.: 11/247,259

(22) Filed: Oct. 12, 2005

(65) Prior Publication Data

US 2006/0077483 A1    Apr. 13, 2006

(30) Foreign Application Priority Data

Oct. 13, 2004 (JP) .............................. P2004-299215

(51) Int. Cl.
*H04N 5/765* (2006.01)

(52) U.S. Cl. ....................................................... 386/232

(58) Field of Classification Search .................. 386/120, 386/125–126, 95, 90, 91, 124, 232, 344, 386/224, 326, 328, 329, 333
See application file for complete search history.

(56) References Cited

U.S. PATENT DOCUMENTS

| | | | |
|---|---|---|---|
| 6,215,746 B1* | 4/2001 | Ando et al. | 369/53.2 |
| 6,876,612 B2* | 4/2005 | Yoneyama et al. | 369/47.55 |
| 2003/0152365 A1* | 8/2003 | Nagayama | 386/69 |
| 2005/0083414 A1* | 4/2005 | Hidaka et al. | 348/220.1 |

FOREIGN PATENT DOCUMENTS

| | | |
|---|---|---|
| JP | 2003-317398 | 11/2003 |
| JP | 2004-201170 | 7/2004 |

OTHER PUBLICATIONS

A Real Time Recording System for Camcorders on the DVD Video Format by Hiroyuki Marumori, Hiroshi Chiba, and Susumu Yoshida (IEEE Transactions on Consumer Electronics, vol. 49, No. 4. Nov. 2003).*

* cited by examiner

*Primary Examiner* — Tat Chio
(74) *Attorney, Agent, or Firm* — Finnegan, Henderson, Farabow, Garrett & Dunner L.L.P.

(57) ABSTRACT

A recording apparatus for recording data of a moving image and a still image onto an optical disk, includes a converter for converting the data of the still image into moving image data in the same format as the data of the moving image when the optical disk is finalized, a controller for controlling, based on a predetermined condition, the decision of the converter as to whether to convert the data of the still image into the moving image data, and a recorder for recording the moving image data converted by the converter onto the optical disk.

16 Claims, 14 Drawing Sheets

RECORDING APPARATUS, RECORDING METHOD, AND COMPUTER PROGRAM

CROSS REFERENCES TO RELATED APPLICATIONS

The present invention contains subject matter related to Japanese Patent Application JP 2004-299215 filed in the Japanese Patent Office on Oct. 13, 2004, the entire contents of which are incorporated herein by reference.

BACKGROUND OF THE INVENTION

1. Field of the Invention

The present invention relates to a recording apparatus, a recording method, and a computer program and, in particular, to a recording apparatus, a recording method, and a computer program for allowing a user to select whether to convert data of a still image to moving image data when an optical disk is finalized.

2. Description of the Related Art

Digital versatile disks (DVDs) having a large storage capacity include a DVD-R (recordable) permitting only one-time recording, and a DVD-RW (rewritable) and a DVD-RAM (random-access memory), each disk type permitting a plurality of times of recording. Also available are DVD+R and DVD+RW disks, as non-standard disks of the DVD forum.

To play back data recorded on a variety of types of disks on a playback only DVD player, a finalize process is required. The finalize process is an arrangement process for arranging, from an inner circle of the DVD, a lead-in region, a universal disk format (UDF) region, a video manage (VMG) region, a data region, and a lead-out region in order to organize data recorded on a DVD in a data format compatible with a playback only DVD-ROM (read-only memory). The data format replayable on the playback only DVD player is generally referred to as a DVD video format.

When the data of the still image and the data of the moving image are recorded on the DVD, only the data of the moving image is finalized in a typical finalize process (i.e., data converted into a format replayable on a DVD player) while the data of the still image is not finalized. Users can view the moving image recorded on the DVD but cannot view the still image on the DVD player.

Japanese Unexamined Patent Application Publication No. 2003-317398 discloses a technique that allows a user to view both a moving image and a still image on a DVD player. In the disclosed technique, data of the still image previously recorded on the DVD is converted into data identical in format to the data of a moving image (hereinafter referred to as moving image data) in the finalize process. By converting the still image into the moving image, the user can view both the moving image and the still image on the DVD player without the need for a personal computer.

SUMMARY OF THE INVENTION

A process of converting a still image into a moving image takes time. Even if a still image is recorded on a DVD, the conversion of the still image into the moving image is a process unnecessary for a user who wishes to view only the moving image on a DVD player. Time required for the finalize process including the conversion of the still image into the moving image (waiting time) is simply extended.

Whether to convert the data of the still image into the moving image data in the finalize process is preferably selectable.

It is desirable to allow the user to select in the finalize process of an optical disk whether to convert the data of the still image into the moving image data.

In accordance with one embodiment of the present invention, a recording apparatus for recording data of a moving image and a still image onto an optical disk, includes a converting unit for converting the data of the still image into moving image data in the same format as the data of the moving image when the optical disk is finalized, a control unit for controlling, based on a predetermined condition, the decision of the converting unit as to whether to convert the data of the still image into the moving image data, and a recording unit for recording the moving image data converted by the converting unit onto the optical disk.

The control unit may control the decision of the converting unit not to convert the data of the still image into the moving image data if the number of still images recorded on the optical disk after releasing last finalize process of the optical disk subsequent to the conversion of the data of the still image to the moving image data is less than a predetermined number.

The control unit may control the decision of the converting unit to convert the data of the still image into the moving image data if the optical disk is a write-once medium that permits only one-time writing.

The control unit may control the decision of the converting unit to convert the data of the still image into the moving image data if a predetermined operation mode is in operation.

In accordance with another embodiment of the present invention, a recording method of recording data of a moving image and a still image onto an optical disk, includes steps of converting the data of the still image into moving image data in the same format as the data of the moving image when the optical disk is finalized, controlling, based on a predetermined condition, the decision as to whether to convert the data of the still image into the moving image data, and recording the moving image data converted in the converting step onto the optical disk.

In accordance with yet another embodiment of the present invention, a computer program causes a computer to record data of a moving image and a still image onto an optical disk. The computer program includes program code for performing steps of converting the data of the still image into moving image data in the same format as the data of the moving image when the optical disk is finalized, controlling, based on a predetermined condition, the decision as to whether to convert the data of the still image into the moving image data, and recording the moving image data converted in the converting step onto the optical disk.

In accordance with embodiments of the present invention, the data of the still image is converted into the moving image data in the same format as the data of the moving image when the optical disk is finalized. Whether to convert the data of the still image into the moving image data is controlled based on the predetermined condition. The converted moving image data is then recorded onto the optical disk.

In accordance with embodiments of the present invention, whether to convert the data of the still image into the moving image data is selectable in the finalize process of the optical disk.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

A recording apparatus of one embodiment of the present invention for recording data of a moving image and a still image onto an optical disk, includes a converting unit (for example, an audio and video signal processor 12 of FIG. 1) for converting the data of the still image into moving image data in the same format as the data of the moving image when the optical disk is finalized, a control unit (for example, an arithmetic processing unit 16 of FIG. 1) for controlling, based on a predetermined condition, the decision of the converting unit as to whether to convert the data of the still image into the moving image data, and a recording unit (for example, a disk controller 13 of FIG. 1) for recording the moving image data converted by the converting unit onto the optical disk.

Figure 3:
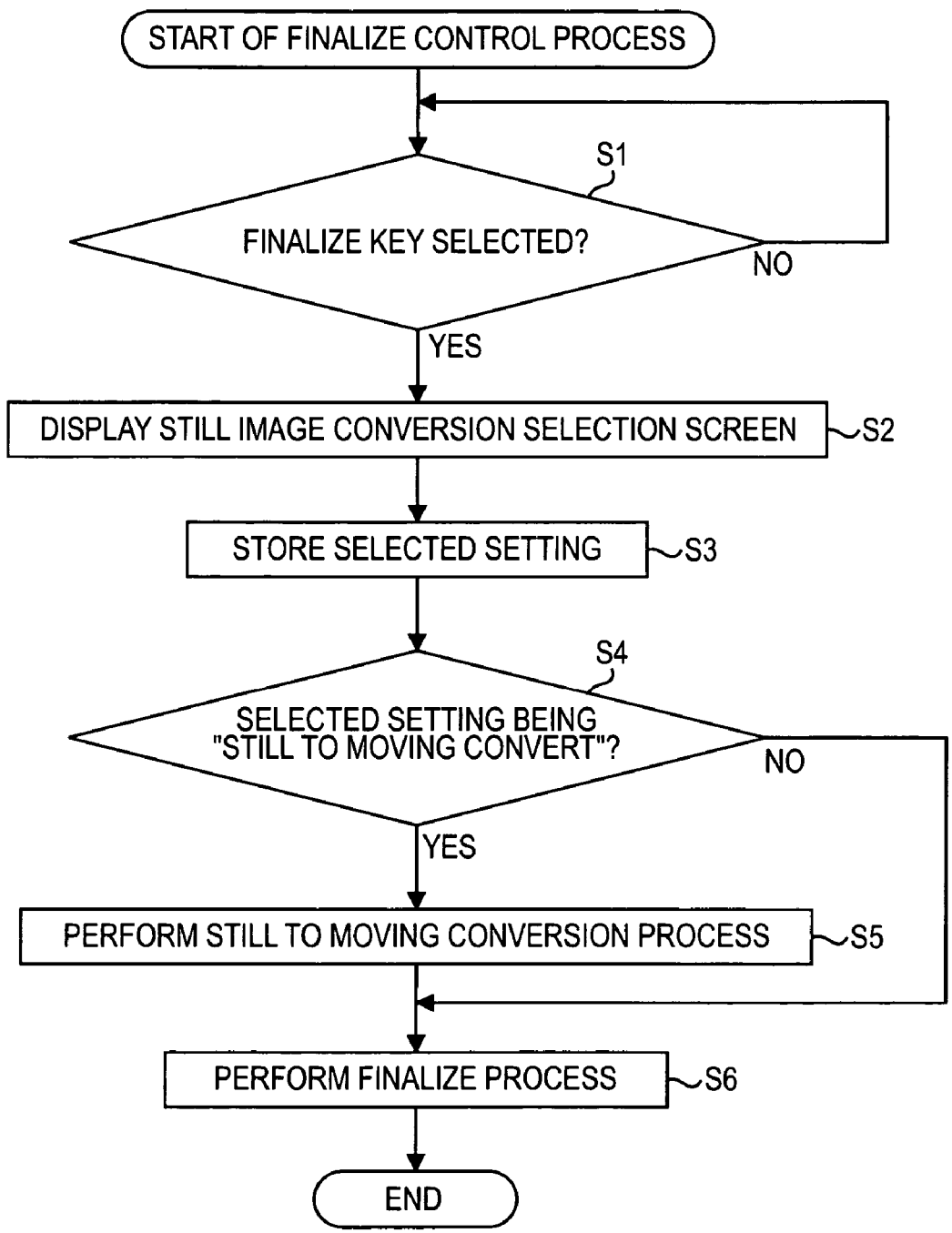
FIG. 3 is a flowchart illustrating a finalize control process.

A recording method of another embodiment of the present invention of recording data of a moving image and a still image onto an optical disk, includes steps of converting the data of the still image into moving image data in the same format as the data of the moving image when the optical disk is finalized (for example, in step S5 of FIG. 3), controlling, based on a predetermined condition, the decision as to whether to convert the data of the still image into the moving image data (for example, in step S4 of FIG. 3), and recording the moving image data converted in the converting step onto the optical disk (for example, in step S5 of FIG. 3).

A computer program of yet another embodiment of the present invention also includes the same steps as the above-referenced recording method.

The embodiments of the present invention are described below more specifically.

Figure 1:
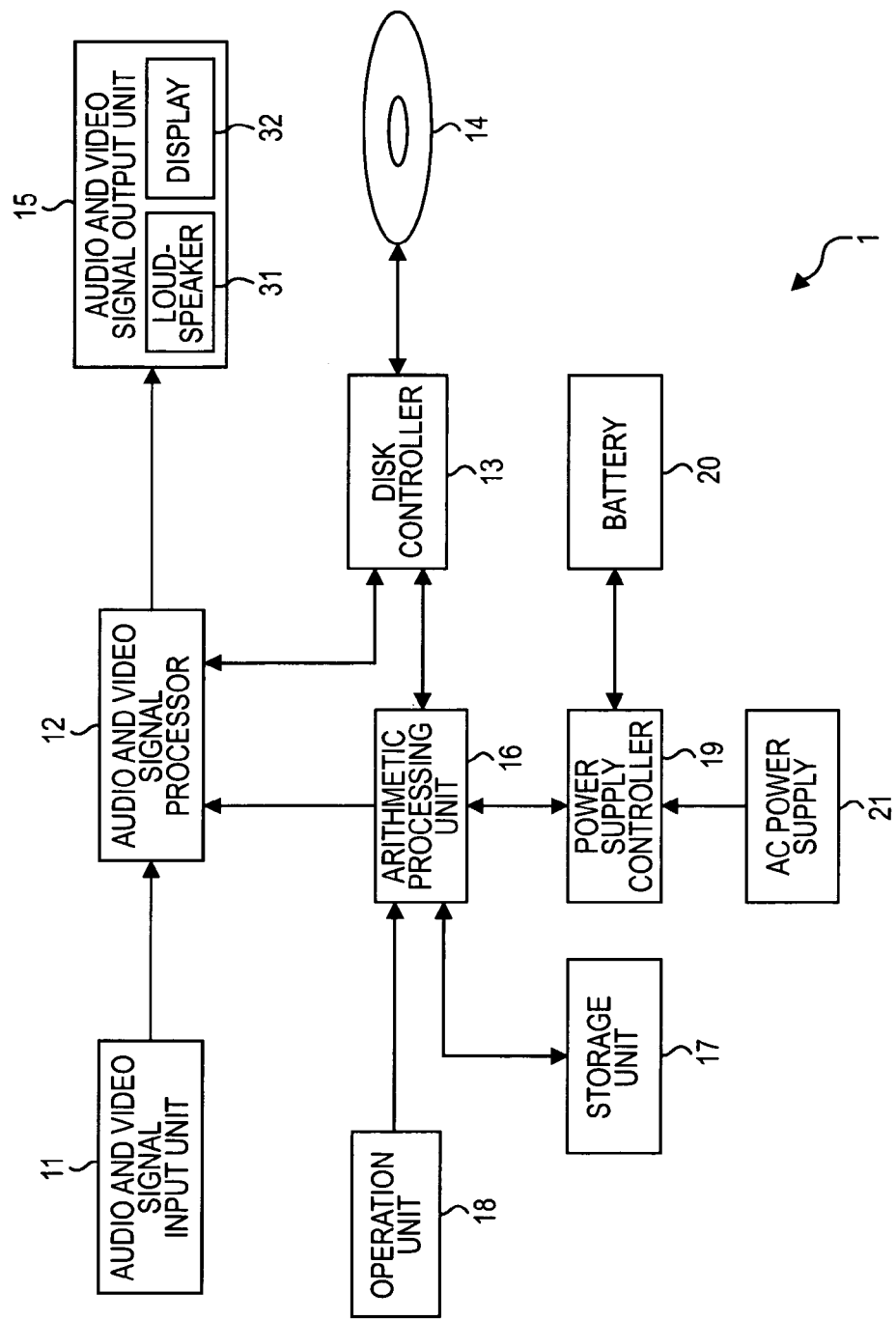
FIG. 1 is a block diagram illustrating a recording and playback apparatus in accordance with one embodiment of the present invention.

FIG. 1 is a block diagram of a recording and playback apparatus 1 in accordance with one embodiment of the present invention.

The recording and playback apparatus 1 includes an audio and video signal input unit 11, an audio and video signal processor 12, a disk controller 13, a DVD (optical disk) 14, an audio and video signal output unit 15, an arithmetic processing unit 16, a storage unit 17, an operation unit 18, a power supply controller 19, a battery 20, and an AC (alternating current) power supply 21. The audio and video signal output unit 15 includes at least both a loudspeaker 31 and a display 32.

The audio and video signal input unit 11 includes an image pickup device including a lens and one of a charge coupled device (CCD) and a complementary metal oxide semiconductor (CMOS) device, a microphone, a signal processing circuit performing analog-to-digital conversion process, and input terminals. The audio and video signal input unit 11 converts analog-to-digital converts an audio signal and/or a video signal input from the image pickup device or via the input terminals, and supplies the resulting audio signal and/or video signal to the audio and video signal processor 12.

The audio and video signal processor 12 includes an encode/decode processing circuit for encoding and/or decoding data in accordance with the moving picture experts group (MPEG) standard, a synthesizing circuit that synthesizes the video signal and OSD (on-screen display) signal to display the video signal on the display 32 in an OSD fashion, an error checking and correction circuit (ECC) for performing ECC process on the audio signal and/or video signal, and a finalizing circuit for finalizing the DVD 14.

The audio and video signal processor 12 encodes the audio signal and/or the video signal supplied from the audio and video signal input unit 11, as necessary, and supplies the encoded audio signal and/or the encoding video signal to the disk controller 13. The audio and video signal processor 12 decodes the audio signal and/or the video signal supplied from one of the audio and video signal input unit 11 and the disk controller 13, and supplies the decoded audio signal and/or the decoded video signal to the audio and video signal output unit 15. If the OSD signal is supplied from the arithmetic processing unit 16, the audio and video signal processor 12 synthesizes the OSD signal and the video signal, and outputs the synthesized video signal to the audio and video signal output unit 15.

Upon receiving, from the arithmetic processing unit 16, a control signal for finalizing the DVD 14, the audio and video signal processor 12 performs the finalize process. If the finalize process is performed subsequent to the conversion of the data of the still image recorded on the DVD 14 to the moving image data, the audio and video signal processor 12 is also supplied with a control signal for converting the data of the still image to the moving image data from the arithmetic processing unit 16. The audio and video signal processor 12 converts the data of the still image recorded on the DVD 14 into the moving image data, and then performs the finalize process. The audio and video signal processor 12 supplies the disk controller 13 with the converted moving data (video data), and information to be written onto a lead-in region, a universal disk format (UDF) region, a video manage (VMG) region, and a lead-out region of the DVD 14 produced in the finalize process (hereinafter referred to as disk information signal). The conversion process of converting the data of the still image to the moving image data (still to moving conversion process) and the finalize process are disclosed in the previously quoted Japanese Unexamined Patent Application Publication No. 2003-317398 and are not discussed herein.

The disk controller 13 includes a DVD drive including an optical pickup and a spindle motor. The disk controller 13 controls the recording and replaying of data to and from the DVD 14 in the DVD drive. More specifically, the disk controller 13 records (writes), onto the DVD 14, data corresponding to the video signal, the audio signal and the disk information signal supplied from the audio and video signal processor 12. Also, the disk controller 13 converts data read (played back) from the DVD 14 into an audio signal and/or a video signal, and outputs the audio signal and/or the video signal to the audio and video signal processor 12.

The disk controller 13 determines the type of the DVD 14 and the number of still images recorded on the DVD 14. The DVD 14 can be one of a playback only DVD-ROM, a write-once DVD-R permitting only one-time data writing, and a DVD-RW permitting a plurality of times of writing. The disk controller 13 supplies the determination results to the arithmetic processing unit 16. The disk controller 13 can determine the type of the DVD 14 by referencing information recorded on the lead-in area of the DVD 14, or by analyzing reflectance of a laser beam reflected from the DVD 14.

The audio and video signal output unit 15 includes at least both the loudspeaker 31 and the display 32 including one of a liquid-crystal display (LCD) and a cathode-ray tube (CRT). The audio and video signal output unit 15 converts one of the video signal and composite video signal supplied from the audio and video signal processor 12 into data in a predetermined format such as one of NTSC (National Television System Committee) format and a PAL (Phase Alternation by Line) format. The audio and video signal output unit 15 displays the video signal on the display 32. The audio and video signal output unit 15 converts the audio signal supplied from the audio and video signal processor 12 into an analog signal and outputs a sound of the audio signal from the loudspeaker 31.

The arithmetic processing unit 16, including a central processing unit (CPU), a read-only memory (ROM), a random-access memory (RAM), controls the elements in the recording and playback apparatus 1 in response to operational signals from the operation unit 18. For example, upon receiving, from the operation unit 18, an operational signal for finalizing the DVD 14, the arithmetic processing unit 16 supplies, to the audio and video signal processor 12, a control signal for finalizing the DVD 14 and a control signal for converting the data of the still image into the moving image data. To display an OSD screen on the display 32 in the audio and video signal output unit 15, the arithmetic processing unit 16 supplies, to the audio and video signal processor 12, an OSD signal corresponding to the OSD screen.

Even if an OSD signal not synthesized with a predetermined video signal is supplied from the audio and video signal processor 12, the audio and video signal output unit 15 can display the OSD signal as a predetermined screen on the display 32. For example, upon receiving, from the operation unit 18, an operational signal for finalizing the DVD 14, the arithmetic processing unit 16 supplies, to the audio and video signal output unit 15 via the audio and video signal processor 12, an OSD signal for displaying a screen that prompts a user to select whether to convert the data of the still image into the moving image data (still to moving conversion selection screen). In response to the supplied OSD signal, the audio and video signal output unit 15 causes the display 32 to display the still to moving conversion selection screen. Image data forming the still to moving conversion selection screen is stored in the storage unit 17, and is supplied from the storage unit 17 to the arithmetic processing unit 16 as necessary.

As previously discussed, the arithmetic processing unit 16 receives, from the disk controller 13, the information relating to the type of the medium of the DVD 14, and the number of still images on the DVD 14. Furthermore, the arithmetic processing unit 16 receives, from the power supply controller 19, information as to whether the recording and playback apparatus 1 is operated from an AC power supply or the battery 20 (hereinafter referred to as power supply information).

The storage unit 17 stores the image data forming the still to moving conversion selection screen and selection information as to whether the user selects to convert the data of the still image into the moving image data in the finalize process, and supplies the information to the arithmetic processing unit 16 as necessary.

The operation unit 18 includes operation keys such as numeric keys, a keyboard, a mouse, a touchpanel, and a remote controller. In response to a user operational input, the operation unit 18 supplies an operational signal responsive to the user operational input to the arithmetic processing unit 16. For example, the user starts and ends the recording and playback of the DVD 14 using the operation unit 18. In this case, the operation unit 18 supplies, to the arithmetic processing unit 16, operational signals for starting and ending one of the recording and playback of the audio and video signal output unit 15. The operation unit 18 has a finalize key (button) that is selected to finalize the DVD 14. If the user selects the finalize key, the operation unit 18 supplies, to the arithmetic processing unit 16, an operational signal for finalizing the DVD 14.

The power supply controller 19 controls AC power supplied from the AC power supply 21, and supplies the controlled power to the elements in the recording and playback apparatus 1. Furthermore, the power supply controller 19 manages power remaining in the battery 20. If the battery 20 is not fully charged, the power supply controller 19 supplies power from the AC power supply 21 to the battery 20 for charging. The power supply controller 19 supplies, to the arithmetic processing unit 16, the information as to whether the recording and playback apparatus 1 is operated from the AC power from the AC power supply 21 or power from the battery 20 (the power supply information) and information relating to power remaining in the battery 20.

The battery 20 stores power supplied from the power supply controller 19. Conversely, the battery 20 supplies power stored therein to the power supply controller 19. The AC power supply 21 feeds power to the power supply controller 19.

The recording (writing) operation and the playback (reading) operation of the audio signal and/or the video signal (data) onto the DVD 14 in the recording and playback apparatus 1 thus constructed are described below.

To record the audio signal and/or the video signal onto the DVD 14 in the recording and playback apparatus 1, the audio signal and/or the video signal is supplied from the audio and video signal input unit 11 to the audio and video signal processor 12. The audio and video signal processor 12 encodes the audio signal and/or the video signal supplied from the audio and video signal input unit 11 in accordance with the MPEG format, for example, and supplies the encoded signal to the disk controller 13. The disk controller 13 controls an optical pickup, thereby recording the data corresponding to the audio signal and/or the video signal supplied from the audio and video signal processor 12 onto the DVD 14.

To play back the data recorded on the DVD 14 in the recording and playback apparatus 1, the disk controller 13 reads data from the DVD 14, converts the data into the audio signal and/or the video signal, and supplies the audio signal and/or the video signal to the audio and video signal processor 12. The audio and video signal processor 12 performs an error correction process on the audio signal and/or the video signal supplied from the disk controller 13, decodes the error corrected audio signal and/or video signal in accordance with the MPEG format, and outputs the resulting audio signal and/or video signal to the audio and video signal output unit 15. In response to the audio signal and/or the video signal supplied from the audio and video signal processor 12, the audio and video signal output unit 15 displays an image on the display 32 and outputs a sound from the loudspeaker 31.

The finalize process of the recording and playback apparatus 1 for finalizing the DVD 14 is described below.

Figure 2:
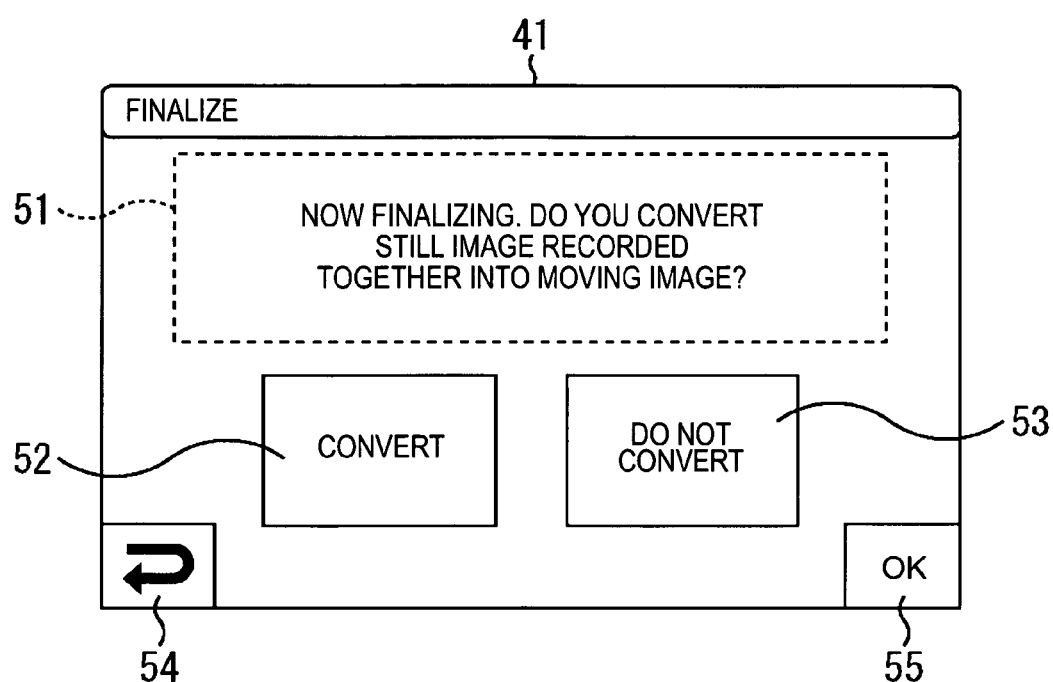
FIG. 2 illustrates a still to moving conversion selection screen.

FIG. 2 illustrates a still to moving conversion selection screen 41 that is displayed on the display 32 when the user selects the finalize key on the operation unit 18. The still to moving conversion selection screen 41 of FIG. 2 appears as one screen when the user enters settings for the finalize process in a wizard manner.

When the finalize key is selected by the user on the operation unit 18, the recording and playback apparatus 1 displays the still to moving conversion selection screen 41 on the display 32, converts the data of the still image to the moving image data, and then prompts the user to select whether to finalize the DVD 14.

The still to moving conversion selection screen 41 is composed of a message area 51, a "convert" button 52, "do not convert" button 53, a "return" button 54, and an "OK" button 55.

A message reading "Now finalizing. Do you convert still image recorded together into moving image?" appears on the message area 51. In response to the displayed message, the user selects the "convert" button 52 to convert a still image into a moving image. If the user does not wish to convert the still image into the moving image, the user selects the "do not convert" button 53. An operational signal indicating whether the "convert" button 52 or the "do not convert" button 53 is selected is supplied from the operation unit 18 to the arithmetic processing unit 16.

If the "return" button 54 is selected by the user, the display 32 displays a screen prior to the still to moving conversion selection screen 41. If the "OK" button 55 is selected by the user, the display 32 displays a screen subsequent to the still to moving conversion selection screen 41. In this case, neither the "convert" button 52 nor the "do not convert" button 53 is selected, and whether to convert the data of the still image into the moving image data is determined based on a default setting stored in the storage unit 17 (for example, a "Do not convert" setting is specified).

A finalize control process of the recording and playback apparatus 1 is described below with reference to a flowchart of FIG. 3.

In step S1, the recording and playback apparatus 1 determines whether the finalize key is selected. If it is determined that the finalize key is not yet selected, the recording and playback apparatus 1 waits on standby until it is determined that the finalize key is selected.

If it is determined in step S1 that the finalize key is selected, in other words, if the arithmetic processing unit 16 receives, from the operation unit 18, an operational signal indicating that the user has selected the finalize key, processing proceeds to step S2. The arithmetic processing unit 16 causes the display 32 to display the still to moving conversion selection screen 41 of FIG. 2 in a wizard manner, and processing proceeds to step S3.

The user selects one of the "convert" button 52 and the "do not convert" button 53 on the still to moving conversion selection screen 41 by using one of the mouse and the keyboard on the operation unit 18. In step S3, the arithmetic processing unit 16 receives the operational signal indicating that one of the "convert" button 52 and the "do not convert" button 53 has been selected. In step S3, the arithmetic processing unit 16 stores, in the storage unit 17, the setting "convert" or the setting "do not convert" respectively responsive to the "convert" button 52 or the "do not convert" button 53 selected by the user. Processing proceeds to step S4.

In step S4, the arithmetic processing unit 16 determines whether the setting selected by the user, namely, the setting relating to the still to moving conversion in the finalize process is a setting "still to moving convert". If it is determined in step S4 that the setting selected by the user is not the setting "still to moving convert", processing proceeds to step S6 with step S5 skipped.

If it is determined in step S4 that the setting relating to the still to moving conversion in the finalize process is the "still to moving convert", processing proceeds to step S5. The recording and playback apparatus 1 converts the data of the still image recorded on the DVD 14 into the moving image data (in the still to moving conversion process). In this way, the converted moving image data is supplied from the audio and video signal processor 12 to the disk controller 13.

Subsequent to step S5 or if it is determined in step S4 that the setting "still to moving convert" is not selected by the user, the audio and video signal processor 12 finalizes the DVD 14 in step S6. The audio and video signal processor 12 supplies the disk information signal to the disk controller 13 so that the data recorded on the DVD 14 becomes compatible with a DVD video format.

In step S6, the disk controller 13 records, onto the DVD 14, data corresponding to the disk information signal supplied from the audio and video signal processor 12. If the moving image data converted from the data of the still image is supplied to the disk controller 13 from the audio and video signal processor 12 subsequent to step S5, the disk controller 13 records the moving image data onto the DVD 14 in step S6, and then records the data corresponding to the disk information signal onto the DVD 14. The disk controller 13 thus ends the finalize process.

In the finalize control process of FIG. 3, the recording and playback apparatus 1 causes the display 32 to display the still to moving conversion selection screen 41 of FIG. 2 in the finalize process, thereby prompting the user to select whether to convert the data of the still image into the moving image data. If the conversion of the data of the still image to the moving image data is selected, in other words, the "convert" button 52 is selected by the user on the still to moving conversion selection screen 41 of FIG. 2, the recording and playback apparatus 1 performs the still to moving conversion process, and then the finalize process.

The user who wishes to view the still image on the DVD player converts the data of the still image to the moving image data before performing the finalize process. The user who wishes to view only the moving image recorded on the DVD 14 saves the time required to convert the data of the still image into the moving image data, thereby ending the finalize process in a short period of time. The time to end the finalize process is thus shortened.

Each time the finalize operation is performed in the finalize control process of FIG. 3, the still to moving conversion selection screen 41 of FIG. 2 is displayed on the display 32, and the recording and playback apparatus 1 prompts the user to select whether to convert the data of the still image into the moving image data. Some users may always select one of the setting "still to moving convert" and the setting "do not still to moving convert". Such users are expected to continue to select the same setting hereinafter. It is inconvenient for such users to select each time in the finalize process whether to convert the data of the still image into the moving image data with reference to the still to moving conversion selection screen 41 of FIG. 2 displayed on the display 32. If one of the setting "still to moving convert" and the setting "do not still to moving convert" is selected by a predetermined number of times, the recording and playback apparatus 1 continuously selects the same setting presuming that the same setting is selected by the user again.

The finalize control process is described below with reference to a flowchart of FIG. 4. In this finalize control process, the same setting is hereinafter continuously selected if the same setting has been selected by a predetermined number of times or more.

In step S21, the recording and playback apparatus 1 determines whether the finalize key is selected. If it is determined that the finalize key is not yet selected, the recording and playback apparatus 1 waits on standby until the finalize key is selected.

If it is determined in step S21 that the finalize key is selected, in other words, the arithmetic processing unit 16 receives, from the operation unit 18, the operational signal responsive to the user operation, processing proceeds to step S22. The arithmetic processing unit 16 determines whether the setting "still to moving convert" has been selected by a predetermined number of times or more. The arithmetic processing unit 16 can cause the storage unit 17 to store the number of times of selection of the setting "still to moving convert" and the setting "do not still to moving convert" on the still to moving conversion selection screen 41 of FIG. 2. In step S22, the arithmetic processing unit 16 determines whether the number of times of selection of the setting "still to moving convert" and the setting "do not still to moving convert" is equal to or higher than the predetermined number of times.

If it is determined in step S22 that the number of times of selection of the setting "still to moving convert" and the setting "do not still to moving convert" is equal to or higher than the predetermined number of times, in other words, if it is determined in step S22 that the number of times of selection of the setting "still to moving convert" is equal to or higher than the predetermined number of times, processing proceeds to step S23. The recording and playback apparatus 1 sets the setting of the still to moving conversion in the finalize process to the setting "still to moving convert", and proceeds to step S28.

If it is determined in step S22 that the number of times of selection of the setting "still to moving convert" is less than the predetermined number of times, processing proceeds to step S24. The arithmetic processing unit 16 determines whether the setting "do not still to moving convert" has been selected by a predetermined number of times or more.

If it is determined in step S24 that the setting "do not still to moving convert" has been selected by a predetermined number of times or more, in other words, if it is determined in step S24 that the number of times of selection of the setting "do not still to moving convert" is equal to or higher than the predetermined number of times, processing proceeds to step S25. The recording and playback apparatus 1 sets the still to moving conversion in the finalize process to the setting "do not still to moving convert", and proceeds to step S28.

If it is determined in step S24 that the setting "do not still to moving convert" has not been selected by the predetermined number of times or more, processing proceeds to step S26.

Steps S26 through S30 are respectively identical to steps S2 through S6 of FIG. 3, and the discussion thereof is omitted herein.

Figure 4:
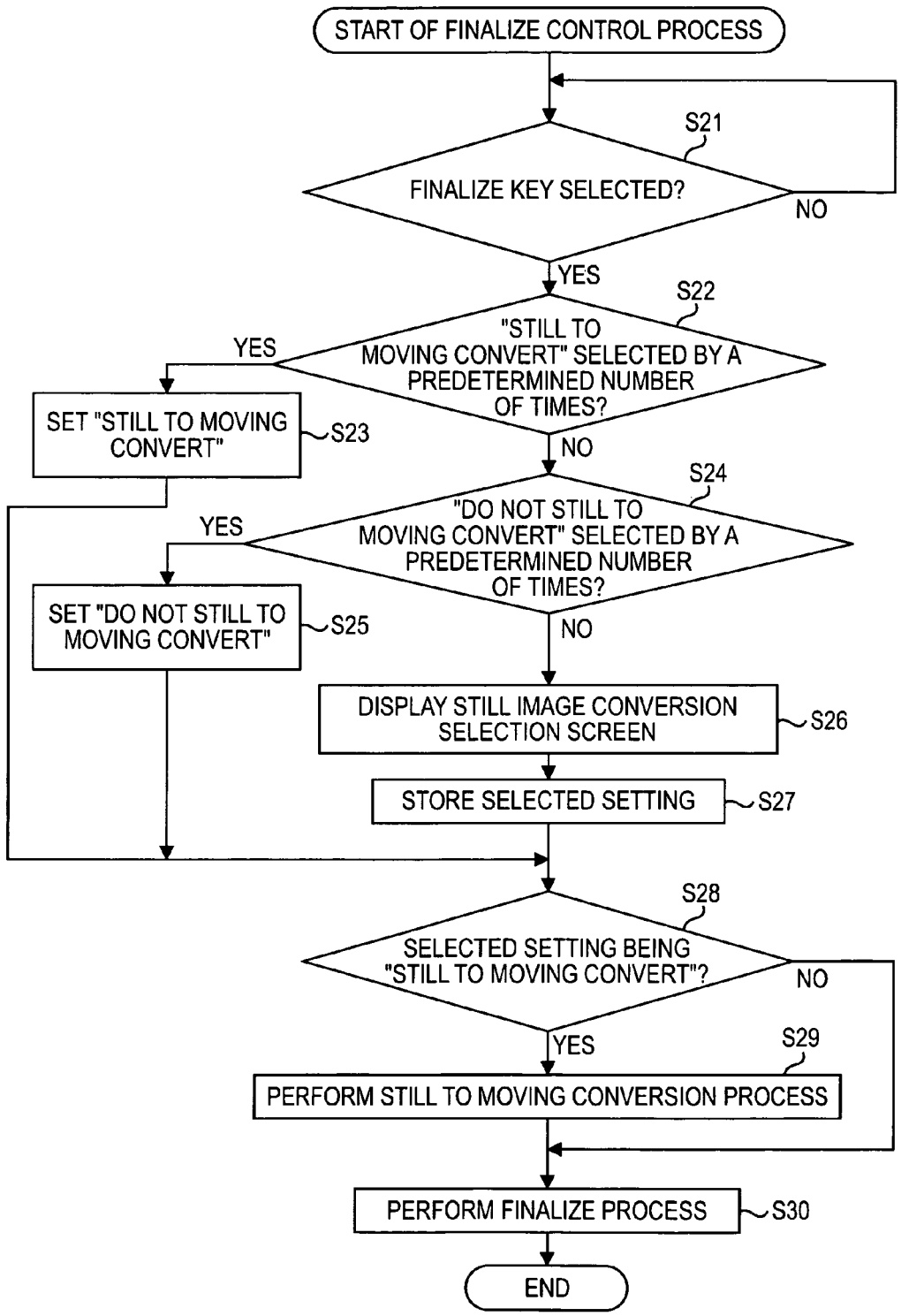
FIG. 4 is a flowchart illustrating the finalize control process.

If the same one of the settings "still to moving convert" and "do not still to moving convert" is repeatedly selected by the predetermined number of times on the still to moving conversion selection screen 41 of FIG. 2 in the finalize control process of FIG. 4, the recording and playback apparatus 1 continues to select the same setting. In this way, the user operation in the still to moving conversion selection is simplified.

Even if the number of selections of the same setting is less than the predetermined number of times, the same setting can be repeated if the user specifies the repeated use of the same setting.

Figure 5:
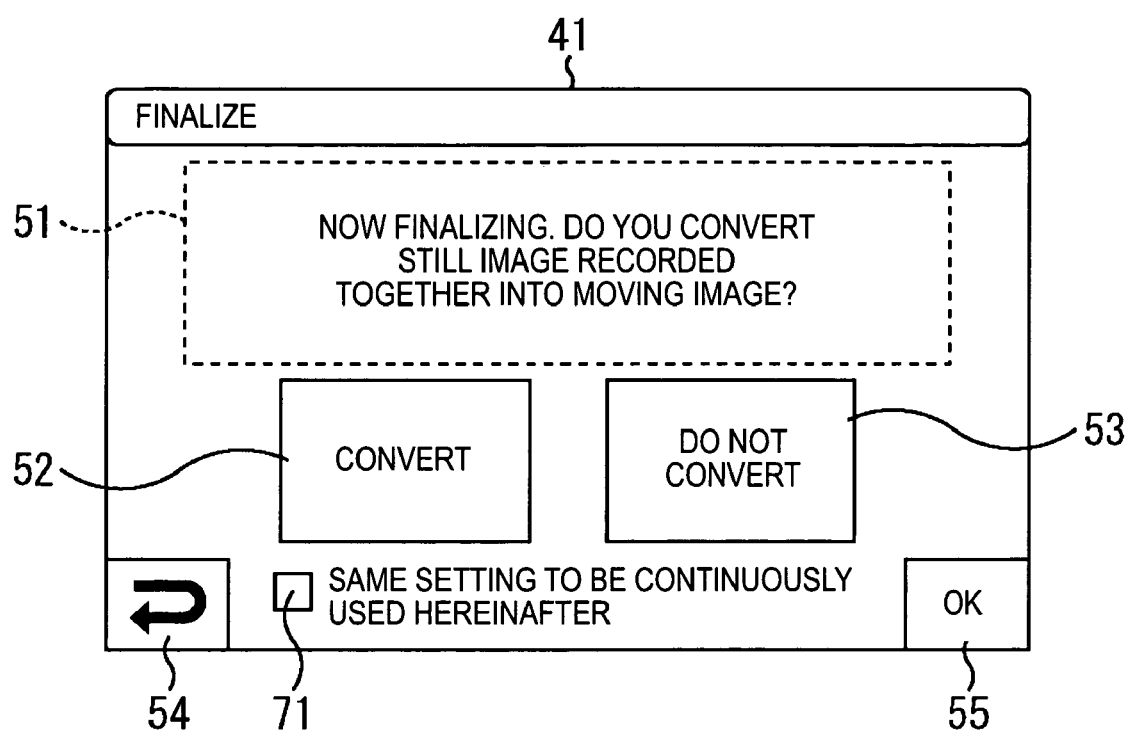
FIG. 5 illustrates a still image conversion selection screen.

FIG. 5 illustrates the still to moving conversion selection screen 41 on which the user is permitted to specify the repeated use of the same setting. Elements identical to those shown in the still to moving conversion selection screen 41 of FIG. 2 are designated with the same reference numerals, and the discussion thereof is omitted herein.

The still to moving conversion selection screen 41 of FIG. 5 is identical to the still to moving conversion selection screen 41 of FIG. 2 except that a check box 71 for specifying "the same setting to be continuously used hereinafter" is provided on the screen.

The user may wish to use the same setting hereinafter on the still to moving conversion selection screen 41 of FIG. 5 displayed on the display 32. The user then turns on the check box 71 and then selects one of the "convert" button 52 and the "do not convert" button 53. The arithmetic processing unit 16 causes the storage unit 17 to store a flag indicating "on" or "off" of the check box 71 in the storage unit 17 together with the setting "still to moving convert" and the setting "do not still to moving convert" respectively responsive to the "convert" button 52 and the "do not convert" button 53. If the flag of the check box 71 stored in the check box 71 is "on", one of the settings selected by the user this time (one of the settings "still to moving convert" and "do not still to moving convert" stored in the storage unit 17) is automatically selected in the future finalize processes without the still to moving conversion selection screen 41 of FIG. 5 (FIG. 2) being displayed on the display 32.

Figure 6:
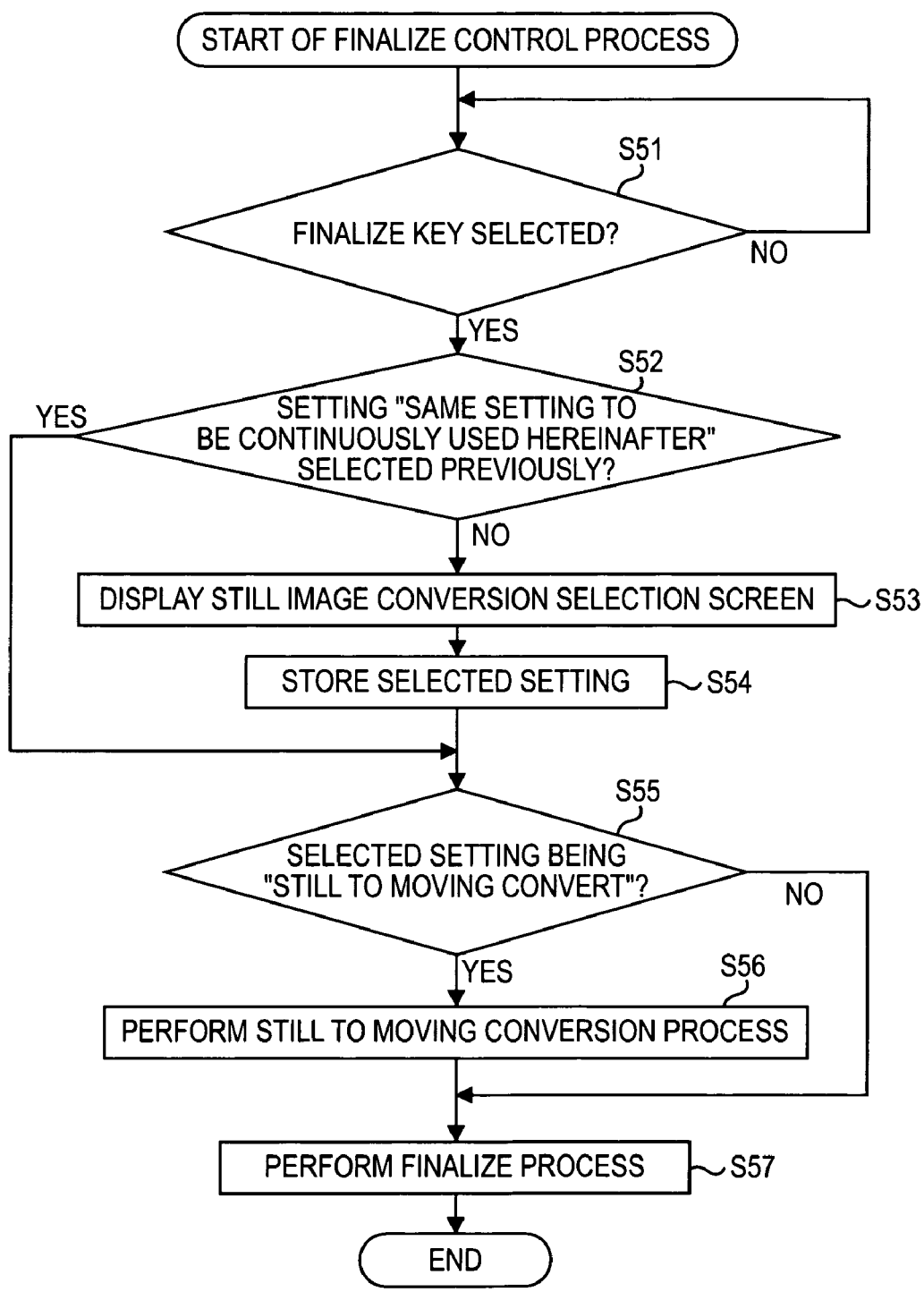
FIG. 6 is a flowchart of a finalize control process.

The finalize control process on the still to moving conversion selection screen 41 of FIG. 5 is described below with reference to a flowchart of FIG. 6.

In step S51, the recording and playback apparatus 1 determines whether the finalize key is selected. If it is determined that the finalize key is not selected, the recording and playback apparatus 1 waits on standby until it is determined that the finalize key is selected.

If it is determined in step S51 that the finalize key has been selected, in other words, if the arithmetic processing unit 16 has received from the operation unit 18 the operational signal indicating that the user has selected the finalize key, processing proceeds to step S52. The arithmetic processing unit 16 determines whether the check box 71 is checked (to be on) to specify the "same setting to be continuously used hereinafter" on the still to moving conversion selection screen 41 of FIG. 5, in other words, determines whether the flag stored in the check box 71 is on.

If it is determined in step S52 that the check box 71 is checked to specify the "same setting to be continuously used hereinafter", in other words, if it is determined in step S52 that the flag stored in the check box 71 is on, processing proceeds to step S55 with steps S53 and S54 skipped.

If it is determined in step S52 that the check box 71 is not checked, in other words, if it is determined in step S52 that the flag stored in the check box 71 is off, processing proceeds to step S53.

Steps S53 through S57 are respectively identical to steps S2 through S6 of FIG. 3, and the discussion thereof is omitted herein. If it is determined in step S52 that the check box 71 is checked to specify the "same setting to be continuously used hereinafter", the arithmetic processing unit 16 determines in step S55 whether the setting stored in the storage unit 17 is whether to convert the data of the still image into the moving image data in this finalize process.

In the finalize control process of FIG. 6, the check box 71 for specifying the "same setting to be continuously used hereinafter" is checked in the still to moving conversion selection screen 41 of FIG. 5. The user is thus freed from an operation for specifying one of the setting "still to moving convert" and the setting "do not still to moving convert" in the subsequent finalizing processes. The user operation is simplified.

The finalize control process is further described with reference to a flowchart of FIG. 7. In this finalize control process, the still to moving conversion selection screen 41 of FIG. 5 (FIG. 2) is prevented from being displayed on the display 32.

In step S81, the recording and playback apparatus 1 determines whether the finalize key has been selected. If it is determined that the finalize key has not been selected, the recording and playback apparatus 1 waits on standby until the finalize key is selected.

If it is determined in step S81 that the finalize key is selected, in other words if it is determined in step S81 that the arithmetic processing unit 16 has received, from the operation unit 18, the operational signal indicating that the user has selected the finalize key, processing proceeds to step S82. The arithmetic processing unit 16 determines whether recording and playback apparatus 1 is in a beginner mode.

The recording and playback apparatus 1 has at least two modes, i.e., the beginner mode and a standard mode. In the beginner mode, the recording and playback apparatus 1 performs a minimum amount of operation (including recording and playback operations of the DVD 14) for a user who is unfamiliar with the operation of the recording and playback apparatus 1 and a user who may wish to use the recording and playback apparatus 1 without detailed settings entered. In the standard mode, the use enters settings (selections) of all functions. By operating operation buttons on the operation unit 18, the user sets one of the beginner mode, the standard mode, and any other modes. The operation mode specified by the user is stored in the storage unit 17.

If it is determined in step S82 that the recording and playback apparatus 1 is not in the beginner mode, processing proceeds to step S83. If it is determined in step S82 that the recording and playback apparatus 1 is in the beginner mode, processing proceeds to step S86.

Steps S83 through S87 are respectively identical to steps S2 through S6 of FIG. 3, and the discussion thereof is omitted herein.

If it is determined in step S82 that the recording and playback apparatus 1 is in a mode other than the beginner mode, for example, in the standard mode, the recording and playback apparatus 1 causes the display 32 to display the still to moving conversion selection screen 41 of FIG. 2. The recording and playback apparatus 1 prompts the user to select between the setting "still to moving convert" and the setting "do not still to moving convert", and determines, in response to the setting, whether to convert the data of the still image into the moving image data.

If it is determined in step S82 that the recording and playback apparatus 1 is in the beginner mode, the recording and playback apparatus 1 performs the still to moving conversion process and then the finalize process.

Figure 7:
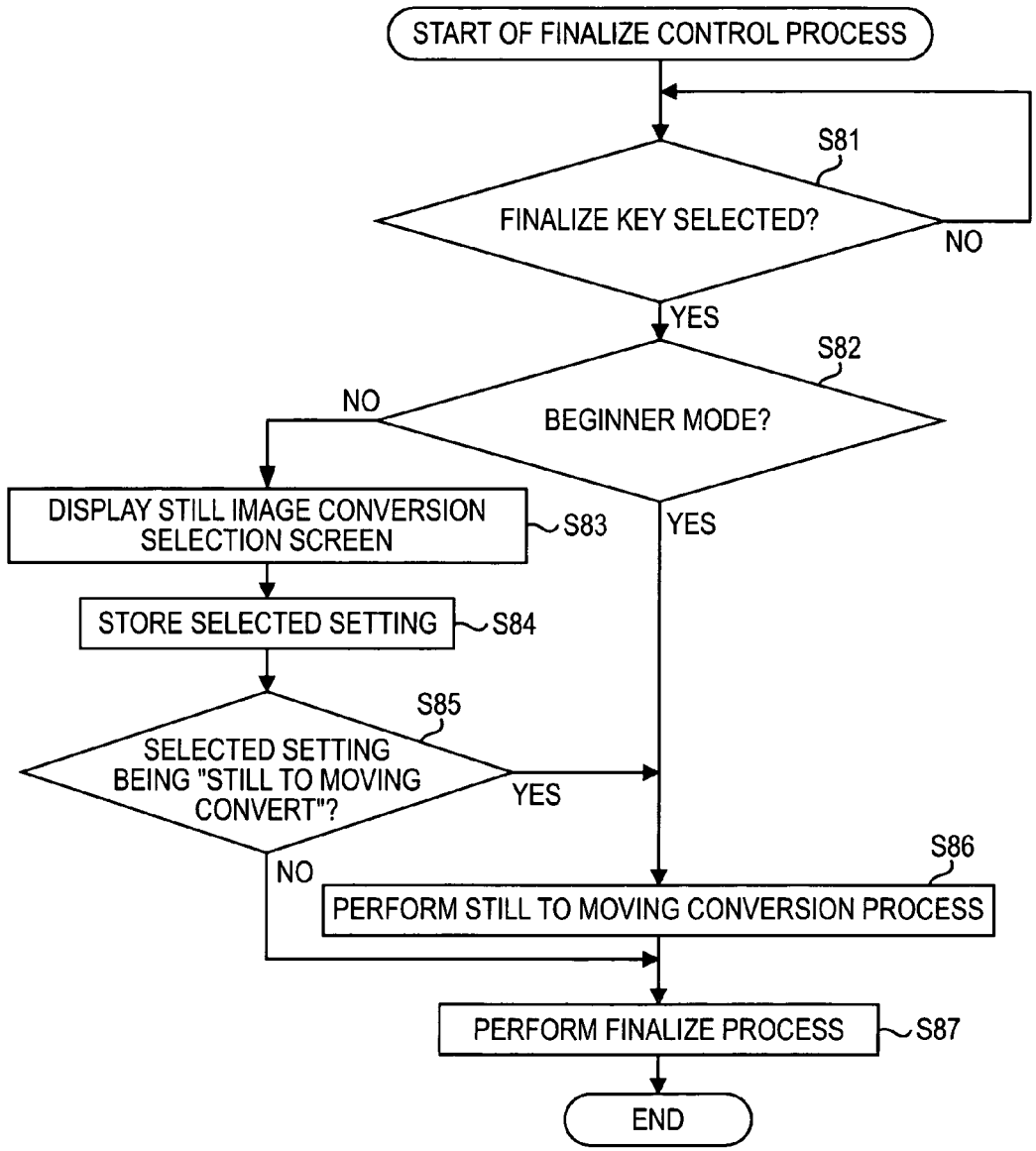
FIG. 7 is a flowchart of a finalize control process.

In the finalize control process of FIG. 7, the recording and playback apparatus 1 determines whether to perform the still to moving conversion process in response to the operation mode such as the beginner mode. A user who is unfamiliar with the recording and playback apparatus 1 can skip the operation for the still to moving conversion selection process.

In the finalize control process discussed heretofore, the still to moving conversion selection screen 41 of FIG. 2 (FIG. 5) is displayed in the finalize process as necessary, and the recording and playback apparatus 1 determine whether to convert the data of the still image into the moving image data in response to the selected setting. In the finalize control process discussed below, the still to moving conversion selection screen 41 of FIG. 2 (FIG. 5) is not displayed in the finalize operation. Depending on a predetermined condition, the arithmetic processing unit 16 in the recording and playback apparatus 1 decides whether to still to moving convert, and the recording and playback apparatus 1 may or may not perform the still to moving conversion process in response to the decision.

Another finalize control process is described below with reference to a flowchart of FIG. 8.

In step S101, the recording and playback apparatus 1 determines whether the finalize key has been selected. If it is determined that the finalize key has not been selected, the recording and playback apparatus 1 waits on standby until it is determined that the finalize key is selected.

If it is determined in step S101 that the finalize key has been selected, processing proceeds to step S102. The arithmetic processing unit 16 performs a still to moving conversion decision process to determine whether to convert the data of the still image into the moving image data. In this conversion decision process, the recording and playback apparatus 1 decide to "still to moving convert" or "not to still to moving convert" the data of the still image stored in the DVD 14 in the finalize process depending on the setting specified on the setting screen on which the user enters a variety of settings, and the media type of the DVD 14.

Processing proceeds to step S103. The recording and playback apparatus 1 determines whether the setting decided in the still to moving conversion decision process of step S102 is the setting "still to moving convert". If it is determined in step S103 that the setting decided in the still to moving conversion decision process of step S102 is not the setting "still to moving convert", in other words is the setting "do not still to moving convert", processing proceeds to step S105 with step S104 skipped.

If it is determined in step S103 that the setting decided in the still to moving conversion decision process of step S102 is the setting "still to moving convert", processing proceeds to step S104. The recording and playback apparatus 1 performs the still to moving conversion process and then proceeds to step S105.

In step S105, the recording and playback apparatus 1 performs the finalize process on the DVD 14, and processing ends.

First through seventh still to moving conversion decision processes, each performed in step S102, are described below.

The first still to moving conversion decision process is described.

In the first still to moving conversion decision process, the setting of whether or not to "still to moving convert" the data of the still image is decided on a still to moving conversion setting screen 101 on which the user enters a variety of settings concerning the recording and playback apparatus 1.

Figure 9:
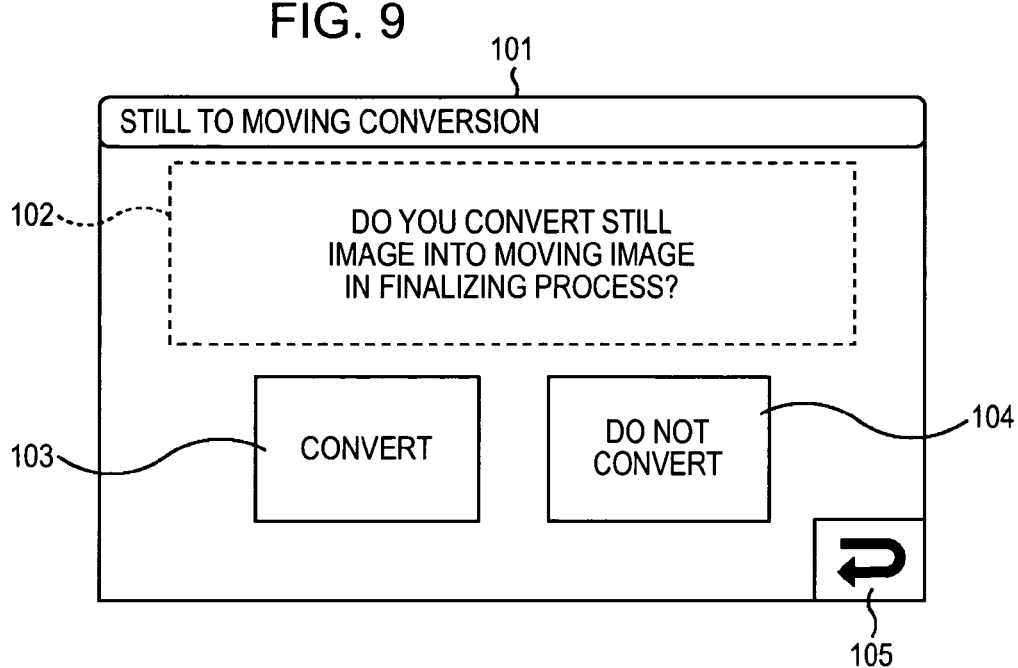
FIG. 9 illustrates a still to moving conversion setting screen.

FIG. 9 illustrates the still to moving conversion setting screen 101 provided to prompt the user to set whether to convert the data of the still image into the moving image data, from among setting screens receiving a variety of user settings.

As shown in FIG. 9, the still to moving conversion setting screen 101 includes a message area 102, a "convert" button 103, a "do not convert" button 104, and a "return" button 105.

The message area 102, the "convert" button 103, the "do not convert" button 104, and the "return" button 105 shown in FIG. 9 are identical in function to the message area 51, the "convert" button 52, the "do not convert" button 53, and the "return" button 54 shown in FIG. 2, respectively, and the discussion thereof are omitted herein.

The setting selected on the still to moving conversion selection screen 101 of FIG. 9 is stored in the storage unit 17. In response to the setting, the recording and playback apparatus 1 decides in the finalize process whether or not to "still to moving convert".

Figure 10:
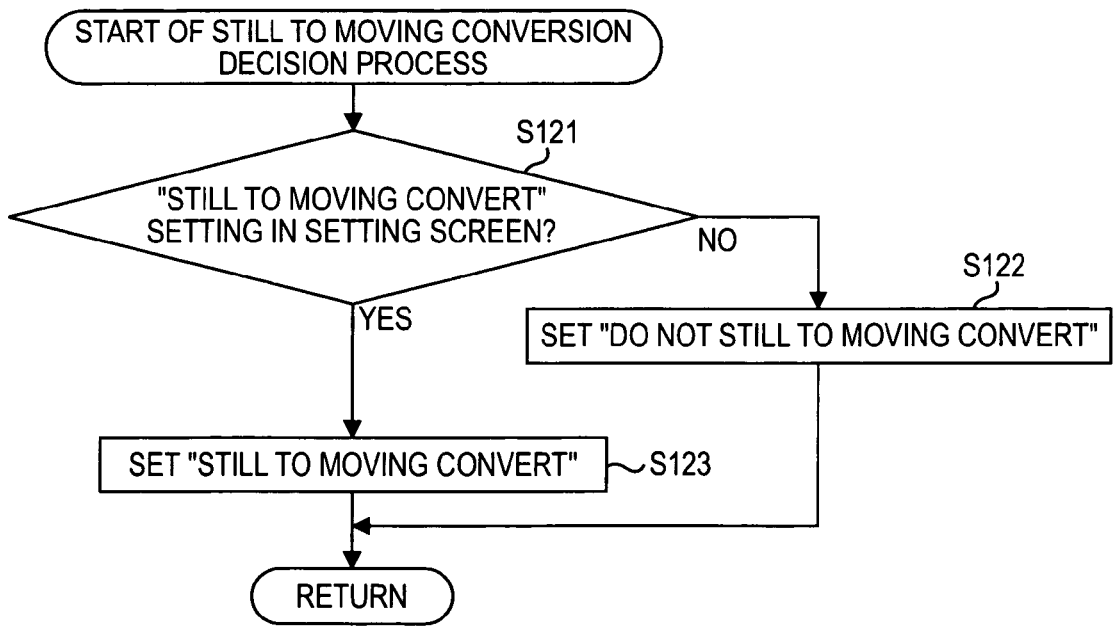
FIG. 10 is a flowchart illustrating a first still to moving conversion decision process.

The first still to moving conversion decision process is described below with reference to a flowchart of FIG. 10.

In step S121, the recording and playback apparatus 1 determines whether the setting relating to the still to moving conversion process entered on the still to moving conversion selection screen 101 of FIG. 9 by the user (the setting relating to the still to moving conversion process stored in the storage unit 17) is the setting "still to moving convert".

If it is determined in step S121 that the setting is not the setting "still to moving convert", processing proceeds to step S122. The recording and playback apparatus 1 determines the setting relating to the still to moving conversion process in this finalize process as being "do not still to moving convert", and returns.

If it is determined in step S121 that the setting is the setting "still to moving convert", processing proceeds to step S123. The recording and playback apparatus 1 decides the setting relating to the still to moving conversion process in this finalize process as being "still to moving convert", and returns.

The second still to moving conversion decision process is described below.

In the second still to moving conversion decision process, the arithmetic processing unit 16 decides the setting relating to the still to moving conversion process in this finalize process as being "still to moving convert" if the media type of the DVD 14 notified of by the disk controller 13 is a write-once medium.

If a write-once medium DVD 14 is finalized, the finalized state cannot be released any longer, and the still to moving conversion process cannot be performed. If the DVD 14 is a write-once media type, the arithmetic processing unit 16 decides the setting relating to the still to moving conversion process in this finalize process as being "still to moving convert".

Figure 11:
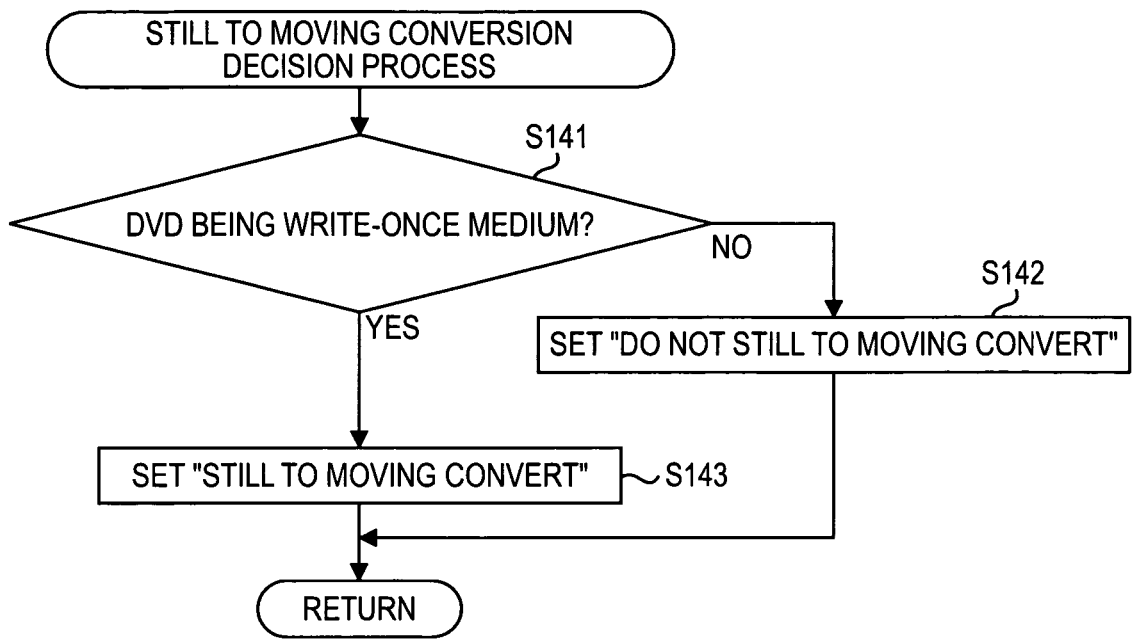
FIG. 11 is a flowchart illustrating a second still to moving conversion decision process.

The second still to moving conversion decision process is described below with reference to a flowchart of FIG. 11.

In step S141, the recording and playback apparatus 1 determines whether the DVD 14 loaded on the disk controller 13 is a write-once media type.

If it is determined in step S141 that the DVD 14 is not a write-once medium, processing proceeds to step S142. The recording and playback apparatus 1 decides the setting relating to the still to the moving conversion process in this finalize process as being "do not still to moving convert".

If it is determined in step S141 that the DVD 14 is a write-once medium, processing proceeds to step S143. The recording and playback apparatus 1 decides the setting relating to the still to the moving conversion process in this finalize process as being "still to moving convert".

The third still to moving conversion decision process is described below.

In the third still to moving conversion decision process, the arithmetic processing unit 16 decides whether or not to "still to moving convert", depending on the number of still images supplied from the disk controller 13 and recorded on the DVD 14.

The still to moving conversion process (in step S104 of FIG. 8) takes some wait time. If the number of still images (data) recorded on the DVD 14 is small, the still to moving conversion process is completed within a short period of time.

If the number of sill images recorded on the DVD 14 is less than a predetermined count, the arithmetic processing unit 16 decides the setting relating to the still to the moving conversion process in this finalize process as being "still to moving convert".

The range of tolerable wait time may be different from user to user. The user is thus permitted to set a predetermined count of still images. If the number of still images is below the predetermined count, the data of the still images is converted into the moving image data.

Figure 12:
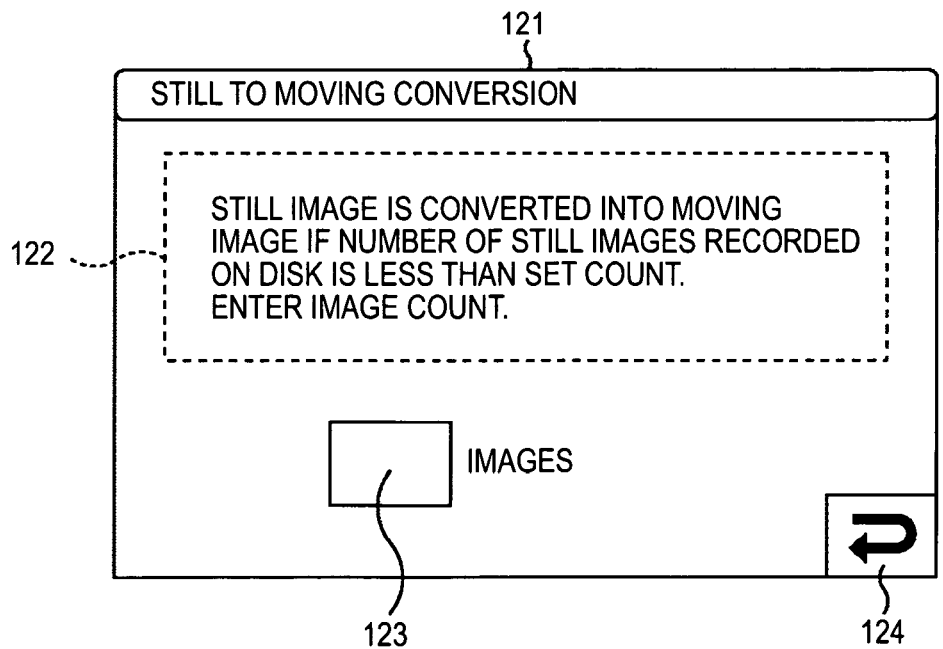
FIG. 12 illustrates a still image count setting screen.

FIG. 12 illustrates a still image count setting screen 121 of the setting screens on which the user enters a variety of settings. The user can enter the predetermined count below which the data of the still images is converted into the moving image data.

The still image count setting screen 121 includes a message area 122, a text box 123, and a "return" button 124.

The message area 122 displays a message reading "Still image is converted into moving image if number of still images recorded on disk is less than set count. Enter image count."

The text box 123 is displayed below the message area 122. The user who is prompted by the message displayed in the message area 122 enters the predetermined count in the text box 123.

The "return" button 124 is selected by the user when the user desires to return from the still image count setting screen 121 to a setting main menu screen (not shown) that allows the user to select therefrom a screen receiving a variety of settings from the user.

Figure 13:
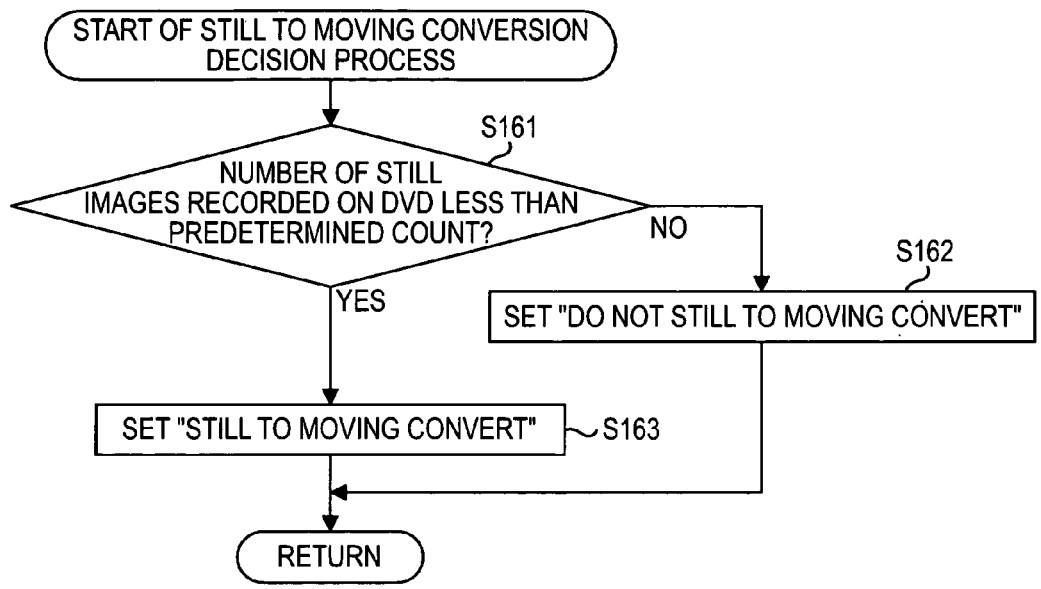
FIG. 13 is a flowchart illustrating a third still to moving conversion decision process.

The third still to moving conversion decision process is described below with reference to a flowchart of FIG. 13.

In step S161, the recording and playback apparatus 1 determines whether the number of still images recorded on the DVD 14 is less than the predetermined count set in the still image count setting screen 121 of FIG. 12.

If it is determined in step S161 that the number of still images recorded on the DVD 14 is not less than the predetermined count, processing proceeds to step S162. The recording and playback apparatus 1 decides the setting relating to the still to the moving conversion process in this finalize process as being "do not still to moving convert", and then returns.

If it is determined in step S161 that the number of still images recorded on the DVD 14 is less than the predetermined count, processing proceeds to step S163. The recording and playback apparatus 1 decides the setting relating to the still to the moving conversion process in this finalize process as being "still to moving convert".

The fourth still to moving conversion decision process is described below.

In the fourth still to moving conversion decision process, the arithmetic processing unit 16 decides the setting relating to the still to the moving conversion process in this finalize process as being "do not still to moving convert" if the number of still images that have been recorded on the DVD 14 since the releasing of last finalize process subsequent to the still to moving conversion process is less than the predetermined count.

When the still to moving conversion was performed in last finalize process, the user presumably has viewed the still image by playing back the finalized DVD 14 on another DVD player. If the number of still images newly recorded since the previous finalize process is small (or zero), time for the still to moving conversion process is consumed for all or most of the still images the user has already viewed. More specifically, wait time is consumed for the still images the user does not need to view.

The arithmetic processing unit 16 decides the setting relating to the still to the moving conversion process in this finalize process as being "do not still to moving convert" if the number of still images that have been recorded on the DVD 14 since the releasing of last finalize process subsequent to the still to moving conversion process is less than the predetermined count.

The number of still images that have been recorded on the DVD 14 since the releasing of last finalize process subsequent to the still to moving conversion process is determined by a difference as below. The number of still images supplied from the disk controller 13 and recorded on the DVD 14 in last finalize process is stored in the storage unit 17. The difference between the stored number of still images and the number of still images supplied from the disk controller 13 this time is thus determined.

Figure 14:
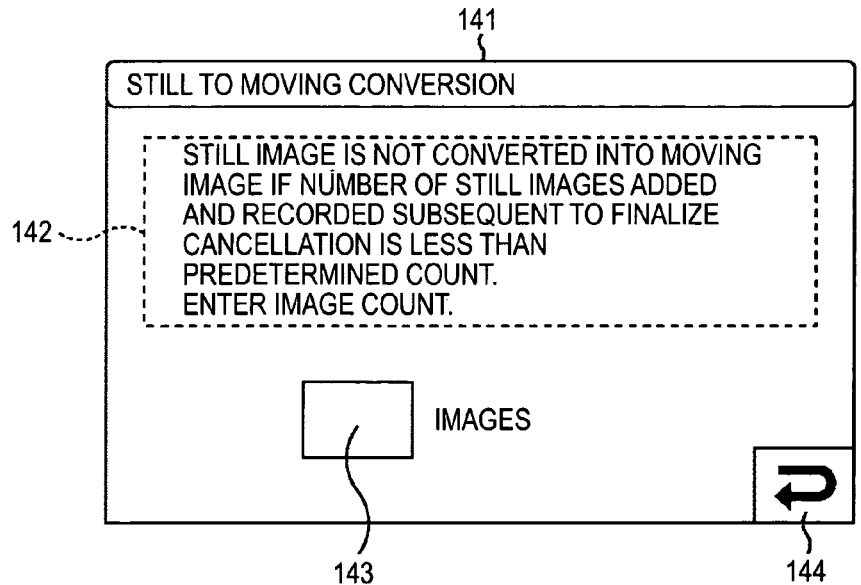
FIG. 14 illustrates an additional still image count setting screen.

As shown in FIG. 14, the user can set the predetermined count of still images as one of a variety of settings of the recording and playback apparatus 1, and the setting "do not still to moving convert" is decided if the number of still images recorded on the DVD 14 is below the predetermined count.

FIG. 14 illustrates, from among the setting screens receiving a variety of user settings of the recording and playback apparatus 1, an additional still image count setting screen 141 on which the user can set the predetermined count. As described above, if the number of still images recorded on the DVD 14 since releasing of last finalize process is below the predetermined count, the data of the still images is not converted into the moving image data.

The additional still image count setting screen 141 includes a message area 142, a text box 143, and a "return" button 144 as shown in FIG. 14.

The message area 142 displays a message reading "Still image is not converted into moving image if number of still images added and recorded subsequent to finalize cancellation is less than predetermined count. Enter image count."

The text box 143 is displayed below the message area 142. A user who is prompted by the message displayed on the message area 142 enters the predetermined count in the text box 143.

The "return" button 144 is selected by the user when the user desires to return from the still image count setting screen 141 to a setting main menu screen (not shown) that allows the user to select therefrom a screen receiving a variety of settings from the user.

Figure 15:
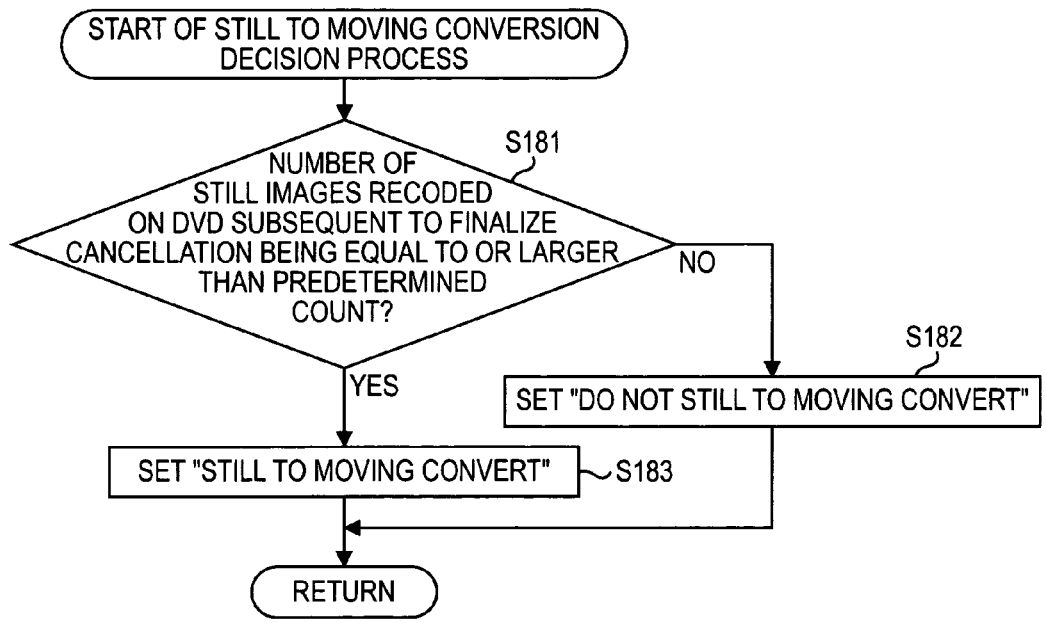
FIG. 15 is a flowchart illustrating a fourth still to moving conversion decision process.

The fourth still to moving conversion decision process is described below with reference to a flowchart of FIG. 15.

In step S181, the recording and playback apparatus 1 determines whether the number of still images recorded on the DVD 14 after releasing of the finalize process of the DVD 14 with the data of the still image converted into the moving image data is equal to or higher than the predetermined count.

If it is determined in step S181 that the number of still images recorded on the DVD 14 is less than the predetermined count, processing proceeds to step S182. The recording and playback apparatus 1 decides the setting relating to the still to the moving conversion process in this finalize process as being "do not still to moving convert", and returns.

If it is determined in step S181 that the number of still images recorded on the DVD 14 is equal to or higher than the predetermined count, processing proceeds to step S183. The recording and playback apparatus 1 decides the setting relating to the still to the moving conversion process in this finalize process as being "still to moving convert", and returns.

The fifth still to moving conversion decision process is described below.

Although both the data of still images and the data of moving images are recorded on the DVD 14, the number of still images recordable on the DVD 14 is subject to limit. This limit to the number of still images is hereinafter referred to a number limit. If the number of still images recorded on the DVD 14 equals the number limit, no further still images cannot be recorded onto the DVD 14 even if the finalization is cancelled.

In the fifth still to moving conversion decision process, the arithmetic processing unit 16 decides the setting relating to the still to the moving conversion process in this finalize process as being "still to moving convert" if the number of still images recorded on the DVD 14 equals the number limit, in other words if no further capacity for still images is available on the DVD 14.

Figure 16:
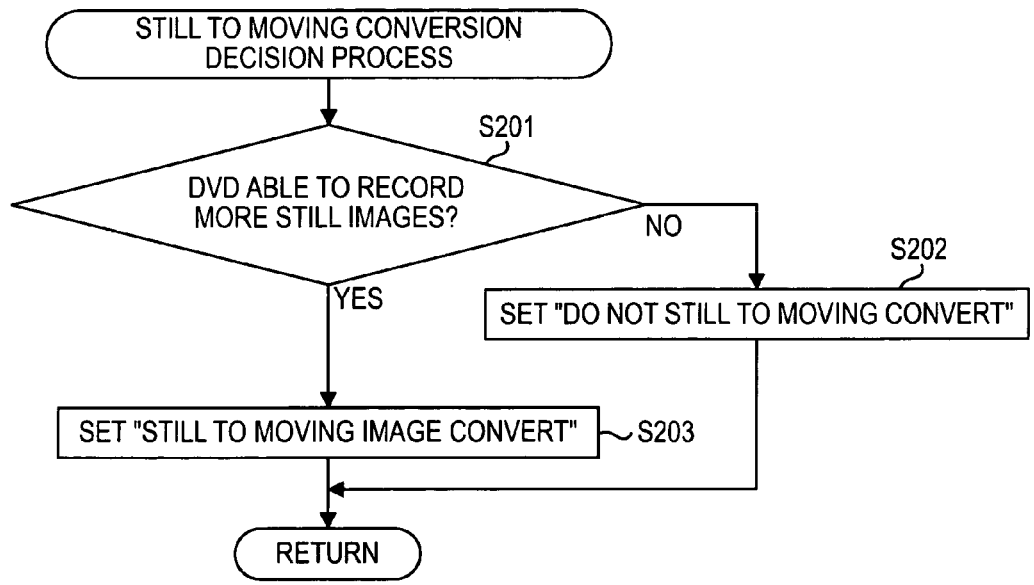
FIG. 16 is a flowchart illustrating a fifth still to moving conversion decision process.

The fifth still to moving conversion decision process is described below with reference to a flowchart of FIG. 16.

In step S201, the recording and playback apparatus 1 determines whether space for still images is available on the DVD 14 (space available is zero).

If it is determined in step S201 that space for still images is available on the DVD 14, more specifically, if it is determined in step S201 that space for at least one still image is available on the DVD 14, processing proceeds to step S202. The recording and playback apparatus 1 decides the setting relating to the still to the moving conversion process in this finalize process as being "do not still to moving convert" and returns.

If it is determined in step S201 that space for still images is not available on the DVD 14, processing proceeds to step S203. The recording and playback apparatus 1 decides the setting relating to the still to the moving conversion process in this finalize process as being "still to moving convert" and returns.

The sixth and seventh still to moving conversion decision processes are described below.

The arithmetic processing unit 16 receives, from the power supply controller 19, information relating to whether the recording and playback apparatus 1 is operated from power from the AC power supply 21 or power from the battery 20 (power supply information), and power remaining in the battery 20.

If the recording and playback apparatus 1 is operated from power from the AC power supply 21, no operation time limit is imposed on the recording and playback apparatus 1, and sufficient time is permitted to finalize the DVD 14.

If the recording and playback apparatus 1 is operated from power of the battery 20, the operation time of the recording and playback apparatus 1 is subject to the power remaining in the battery 20. The still to moving conversion process lengthens time required to finalize the DVD 14 and consumes more power. If the power remaining in the battery 20 is small, the finalize process of the DVD 14 can be interrupted in the middle thereof if the power from the battery 20 fully consumed. If the power available from the battery 20 is small, the user preferably views only the moving image on the DVD player without still to moving converting the images.

In the sixth still to moving conversion decision process, the arithmetic processing unit 16 decides the setting relating to the still to the moving conversion process in this finalize process as being "still to moving convert" if the recording and playback apparatus 1 is operated from the power of the AC power supply 21. The arithmetic processing unit 16 decides the setting relating to the still to the moving conversion process in this finalize process as being "do not still to moving convert" if the recording and playback apparatus 1 is operated from the power of the battery 20. In the seventh still to moving conversion decision process, the arithmetic processing unit 16 decides the setting relating to the still to the moving conversion process in this finalize process as being "still to moving convert" if the power remaining in the battery 20 is above a predetermined power.

Figure 17:
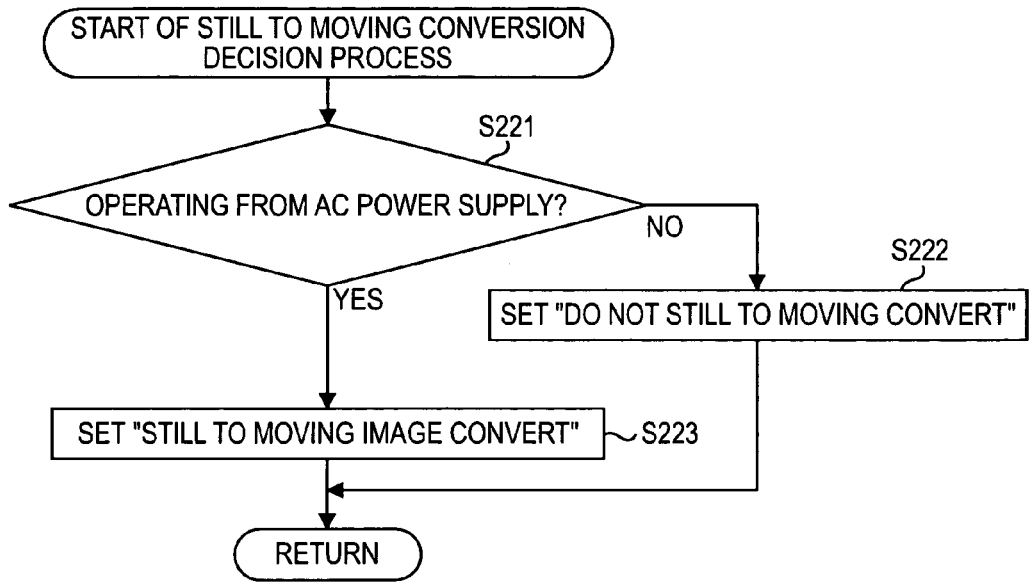
FIG. 17 is a flowchart illustrating a sixth to moving image conversion decision process.

The sixth still to moving conversion decision process is described below with reference to a flowchart of FIG. 17.

In step S221, the recording and playback apparatus 1 determines whether the recording and playback apparatus 1 itself is operated from the power of the AC power supply 21.

If it is determined in step S221 that the recording and playback apparatus 1 is operated not from the power of the AC power supply 21 but from power of the battery 20, processing proceeds to step S222. The recording and playback apparatus 1 decides the setting relating to the still to the moving conversion process in this finalize process as being "do not still to moving convert" and returns.

If it is determined in step S221 that the recording and playback apparatus 1 is operated from the power of the AC power supply 21, processing proceeds to step S223. The recording and playback apparatus 1 decides the setting relating to the still to the moving conversion process in this finalize process as being "still to moving convert" and returns.

Figure 18:
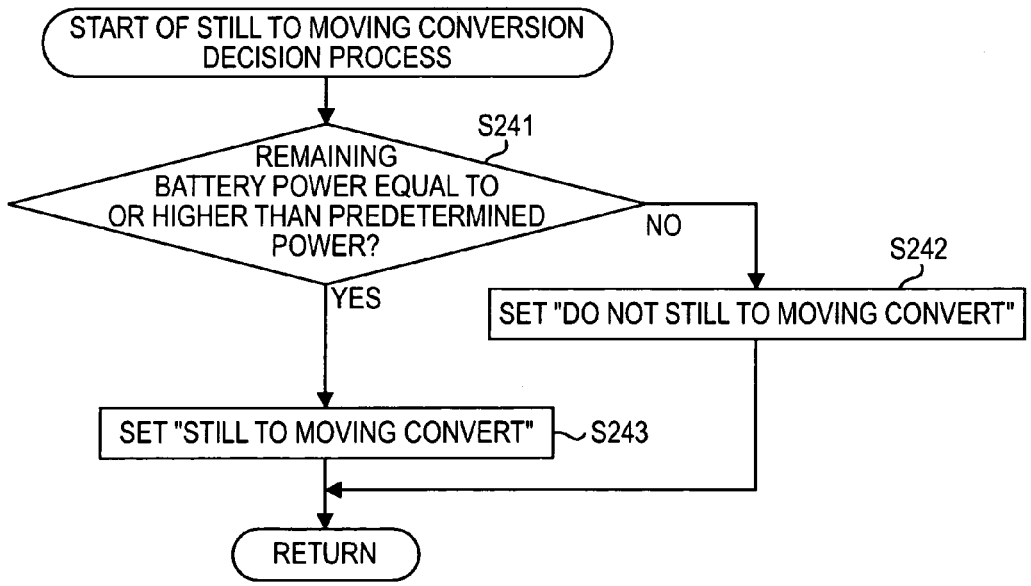
FIG. 18 is a flowchart illustrating a seventh still to moving conversion decision process.

The seventh still to moving conversion decision process is described below with reference to a flowchart of FIG. 18.

In step S241, the recording and playback apparatus 1 determines whether the power remaining in the battery 20 is above a predetermined power.

If it is determined in step S241 that the power remaining in the battery 20 is lower than the predetermined power, processing proceeds to step S242. The recording and playback apparatus 1 decides the setting relating to the still to the moving conversion process in this finalize process as being "do not still to moving convert" and returns.

If it is determined in step S241 that the power remaining in the battery 20 is equal to or higher than the predetermined power, processing proceeds to step S243. The recording and playback apparatus 1 decides the setting relating to the still to the moving conversion process in this finalize process as being "still to moving convert" and returns.

Figure 8:
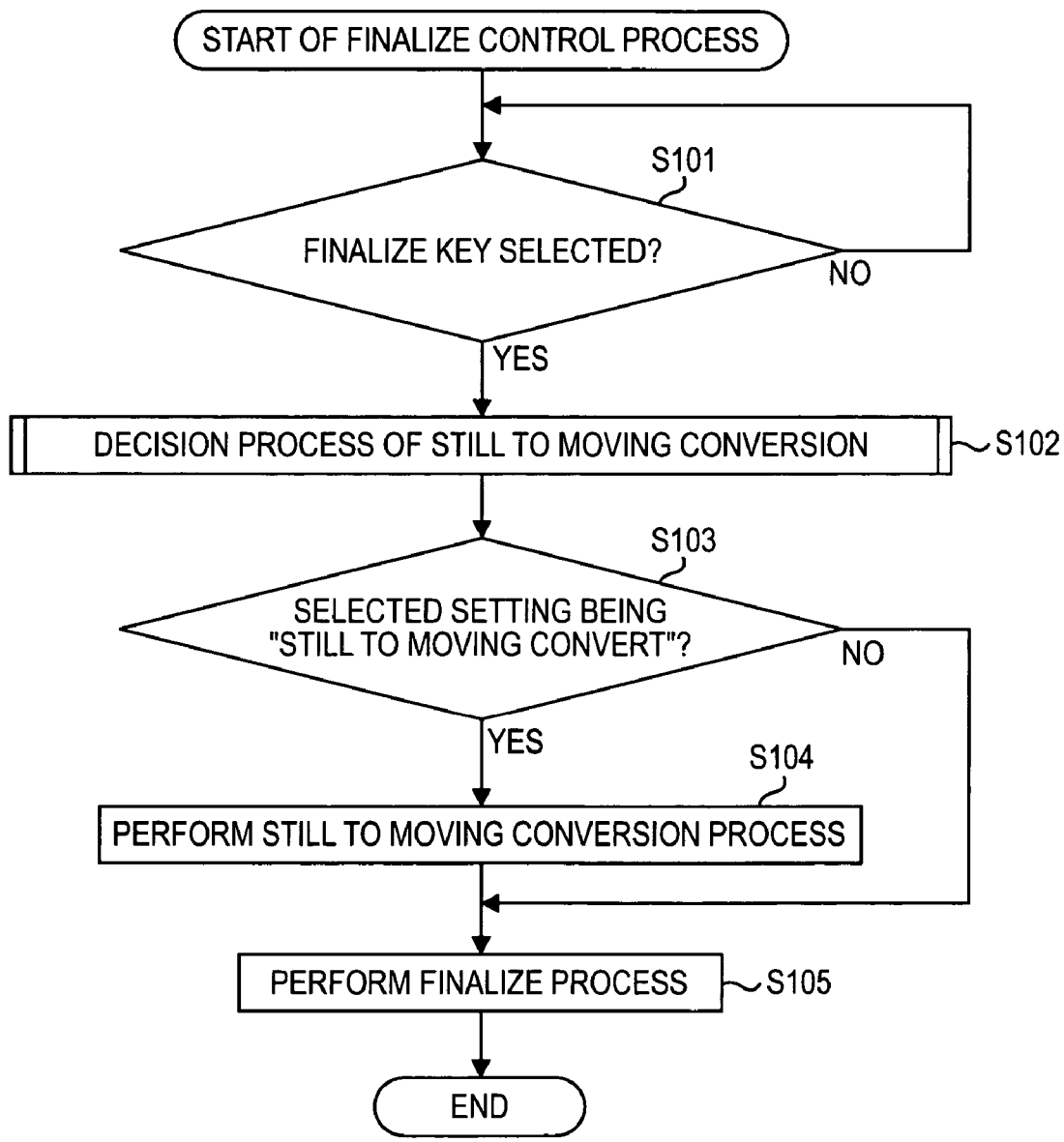
FIG. 8 is a flowchart of a finalize control process.

In the finalize control process of FIG. 8, the arithmetic processing unit 16 determines whether to convert the data of the still image into the moving image data based on the predetermined conditions. The predetermined conditions include the setting on the still to moving conversion selection screen 101 of FIG. 9 (the first still to moving conversion decision process), whether the DVD 14 is a write-once medium (the second still to moving conversion decision process), the number of still images recorded on the DVD 14 (the third still to moving conversion decision process), the number of still images additionally recorded on the DVD 14 after the releasing of last finalize process on the DVD 14 subsequent to the still to moving conversion (the fourth still to moving conversion decision process), the space available for still images on the DVD 14 (the fifth still to moving conversion decision process), whether the recording and playback apparatus 1 is operated from the power of the AC power supply 21 (the sixth still to moving conversion decision process), and the power remaining in the battery 20 (the seventh still to moving conversion decision process).

With this arrangement, there is no need for the recording and playback apparatus 1 to ask the user whether to perform the still to moving conversion. The user is free from unnecessary operations. The operational load on the user is lightened.

When converting the data of the still image to the moving image data, the user is freed from erroneous operations in the still to moving conversion process. When opting not to use the still to moving conversion process, the user, freed from erroneous operations, reliably selects the setting of "do not still to moving convert".

When whether to convert the data of the still image into the moving image data is determined based on the power remaining in the battery 20, time and power required for the conversion process are saved. The interruption of the finalize process due to low power remaining in the battery 20 is less likely to occur.

Whether to convert the data of the still image into the moving image data during the finalize process of the DVD 14 is appropriately set in each finalize control process.

The above-referenced finalize control processes are performed alone or in combination. For example, if the finalize key is selected, the recording and playback apparatus 1 determines whether the recording and playback apparatus 1 itself is in the beginner mode. If it is determined that the recording and playback apparatus 1 is in the standard mode, the recording and playback apparatus 1 determines whether the check box 71 for specifying "the same setting to be continuously used hereinafter" is checked to be on (in the process of FIG. 6). If it is determined that the check box 71 is not checked, the recording and playback apparatus 1 determines whether one of the setting "still to moving convert" and the setting "do not still to moving convert" has been selected by the predetermined number of times.

The recording and playback apparatus 1 determines whether the recording and playback apparatus 1 itself is operated from the power of the AC power supply 21. If it is determined that the recording and playback apparatus 1 is operated from the power of the battery 20, the recording and playback apparatus 1 further determines whether the power remaining in the battery 20 is above the predetermined power. Other finalize control processes may be combined.

A series of process steps in each of the above-referenced finalize control processes can be executed by one of dedicated hardware and software. If software is used, the series of process steps can be performed by a software program that runs in a personal computer of FIG. 19.

Figure 19:
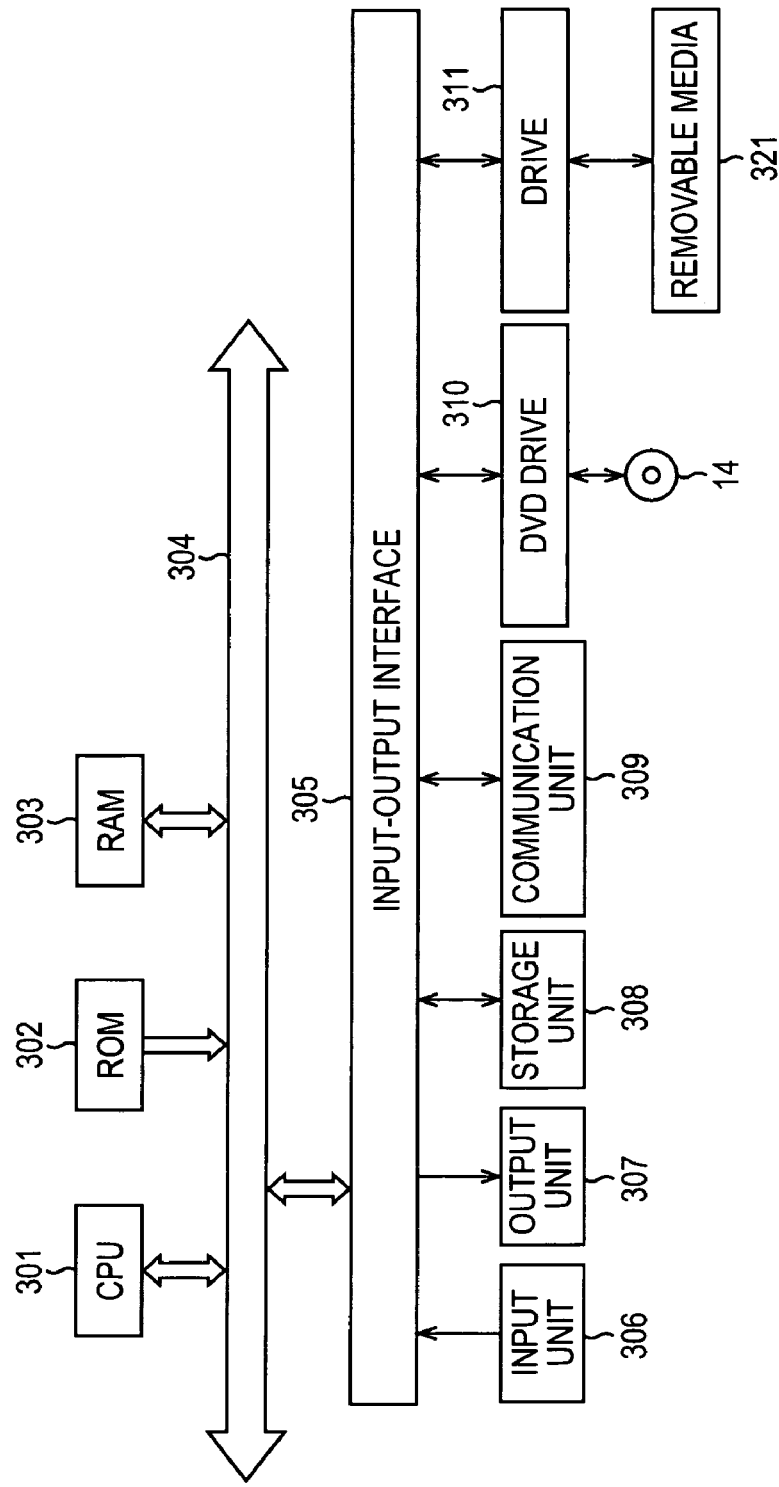
FIG. 19 is a block diagram of a computer in accordance with one embodiment of the present invention.

As shown in FIG. 19, a central processing unit (CPU) 301 performs a variety of processes in accordance with one of a program stored in a read-only memory (ROM) 302 and a program that is loaded from a storage unit 308 to a random-access memory (RAM) 303. The RAM 303 stores, as necessary, data required by the CPU 301. The CPU 301 executes the processes performed by the audio and video signal processor 12 and the arithmetic processing unit 16.

The CPU 301, the ROM 302, and the RAM 303 are interconnected to each other via the bus 304. The bus 304 connects to an input and output interface 305.

Also connected to the input and output interface 305 are an input unit 306 composed of a keyboard, a mouse, and an input terminal, an output unit 307 composed of a display such as a cathode-ray tube (CRT) or a liquid-crystal display (LCD), and a loudspeaker, a storage unit 308 composed of a hard disk, and a communication unit 309 composed of a modem and a terminal adaptor. The communication unit 309 performs a communication process via a network such as the Internet. The input unit 306 performs the function of the operation unit 18. The output unit 307 performs the function of the audio and video signal output unit 15. The storage unit 308 stores the same data as the one stored in the storage unit 17.

Also connected to the input and output interface 305 is a DVD drive 310 that records and/or plays back moving images and/or still images on the DVD 14.

A drive 311 is connected to the input and output interface 305 as necessary. A removable (recording) medium 321 is loaded onto the drive 311. The removable media 321 include an optical disk such as a compact disk read-only memory (CD-ROM), a magneto-optic disk such as MD (Mini-Disk), a semiconductor memory, etc. The computer program read from the removable medium 321 is installed onto the storage unit 308.

The process steps discussed in this specification are sequentially performed in the time sequence order as stated. Alternatively, the steps may be performed in parallel or separately.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus configured to record data of a moving image and data of a still image onto an optical disk, the recording apparatus comprising:
   a control unit that controls, based on a type of medium of the optical disk or a number of still images on the optical disk, a decision as to whether or not to convert the data of the still image into moving image data when the optical disk is finalized;
   a converting unit that converts the data of the still image into the moving image data in a same format as the data of the moving image when:
      the optical disk is finalized, and
      a decision of the control unit is to convert the data of the still image into the moving image data when the optical disk is finalized; and
   a recording unit that records the moving image data converted by the converting unit onto the optical disk when the converting unit converts the data of the still image into the moving image data,
   wherein the decision of the control unit to convert the data of the still image into the moving image data is independent of a decision to record the data of the moving image onto the optical disk, and
   wherein the control unit automatically controls the converting unit not to convert the data of the still image into the moving image data when the number of still images recorded on the optical disk, after completion of a last finalize process of the optical disk, is less than a predetermined number, wherein the last finalize process converted a different still image to the moving image data.

2. The recording apparatus according to claim 1, wherein the control unit controls the decision of the converting unit to convert the data of the still image into the moving image data when the optical disk is a write-once medium that permits only one-time writing.

3. The recording apparatus according to claim 1, wherein the control unit further controls the decision of the converting unit to convert the data of the still image into the moving image data upon determining that a predetermined operation mode, associated with a user of the recording apparatus, is in operation.

4. A recording method of recording data of a moving image and data of a still image onto an optical disk, the recording method comprising steps of:
   controlling, based on a type of medium of the optical disk or a number of still images on the optical disk, a decision as to whether or not to convert the data of the still image into moving image data when the optical disk is finalized;
   converting the data of the still image into the moving image data in a same format as the data of the moving image when:
      the optical disk is finalized; and
      a decision of the controlling step is to convert the data of the still image into the moving image data when the optical disk is finalized; and
   recording the moving image data converted in the converting step onto the optical disk when the converting step converts the data of the still image into the moving image data,
   wherein the decision of the controlling step to convert the data of the still image into the moving image data is independent of a decision to record the data of the moving image onto the optical disk, and
   wherein the controlling step comprises automatically controlling not to convert the data of the still image into the moving image data when the number of still images recorded on the optical disk, after completion of a last finalize process of the optical disk, is less than a predetermined number, wherein the last finalize process converted a different still image to the moving image data.

5. The recording method according to claim 4, further comprising:
   controlling the decision to convert the data of the still image into the moving image data when the optical disk is a write-once medium that permits only one-time writing.

6. The recording method according to claim 4, further comprising:
   controlling the decision to convert the data of the still image into the moving image data upon determining that a predetermined operation mode, associated with a user of the recording apparatus, is in operation.

7. A non-transitory computer-readable medium encoded with program instructions, which, when executed by a processor, cause the processor to perform a method for recording data of a moving image and data of a still image onto an optical disk, the method comprising:
controlling, based on a type of medium of the optical disk or a number of still images on the optical disk, a decision as to whether or not to convert the data of the still image into moving image data when the optical disk is finalized;
converting the data of the still image into the moving image data in a same format as the data of the moving image when:
the optical disk is finalized; and
a decision of the controlling step is to convert the data of the still image
into the moving image data when the optical disk is finalized; and recording the moving image data converted in the converting step onto the optical disk when the converting step converts the data of the still image into the moving image data,
wherein the decision of the controlling step to convert the data of the still image into the moving image data is independent of a decision to record the data of the moving image onto the optical disk, and
wherein the controlling step comprises automatically controlling not to convert the data of the still image into the moving image data when the number of still images recorded on the optical disk, after completion of a last finalize process of the optical disk, is less than a predetermined number, wherein the last finalize process converted a different still image to the moving image data.

8. The non-transitory computer-readable medium according to claim 7, the method further comprising:
controlling the decision to convert the data of the still image into the moving image data when the optical disk is a write-once medium that permits only one-time writing.

9. The non-transitory computer-readable medium according to claim 7, the method further comprising:
controlling the decision to convert the data of the still image into the moving image data upon determining that a predetermined operation mode, associated with a user of the recording apparatus, is in operation.

10. A recording apparatus for recording data of a moving image and data of a still image onto an optical disk, the recording apparatus comprising:
a controller that controls, based on a type of medium of the optical disk or a number of still images on the optical disk, a decision as to whether or not to convert the data of the still image into moving image data when the optical disk is finalized;
a converter that converts the data of the still image into the moving image data in a same format as the data of the moving image when:
the optical disk is finalized; and
a decision of the controller is to convert the data of the still image into the moving image data when the optical disk is finalized; and
a recorder that records the moving image data converted by the converter onto the optical disk when the converter converts the data of the still image into the moving image data,
wherein the decision of the controller to convert the data of the still image into the moving image data is independent of a decision to record the data of the moving image onto the optical disk, and
wherein the controller automatically controls the converter not to convert the data of the still image into the moving image data when the number of still images recorded on the optical disk, after completion of a last finalize process of the optical disk, is less than a predetermined number, wherein the last finalize process converted a different still image to the moving image data.

11. The recording apparatus according to claim 10, wherein the controller controls the converter to convert the data of the still image into the moving image data when the optical disk is a write-once medium that permits only one-time writing.

12. The recording apparatus according to claim 10, wherein the controller further controls the converter to convert the data of the still image into the moving image data upon determining that a predetermined operation mode, associated with a user of the recording apparatus, is in operation.

13. A recording apparatus configured to record data of a moving image and data of a still image onto an optical disk, the recording apparatus comprising:
a control unit that controls, based on a number of still images on the optical disk, a decision as to whether or not to convert the data of the still image into moving image data when the optical disk is finalized;
a convert unit that converts the data of the still image into the moving image data in a same format as the data of the moving image when:
the optical disk is finalized, and
a decision of the control unit is to convert the data of the still image into the moving image data when the optical disk is finalized; and
a record unit that records the moving image data converted by the convert unit onto the optical disk when the convert unit converts the data of the still image into the moving image data
wherein the decision of the control unit to convert the data of the still image into the moving image data is independent of a decision to record the data of the moving image onto the optical disk, and
wherein the control unit automatically controls the convert unit not to convert the data of the still image into the moving image data when the number of still images recorded on the optical disk, after completion of a last finalize process of the optical disk, is less than a predetermined number, wherein the last finalize process converted a different still image to the moving image data.

14. A recording method of recording data of a moving image and data of a still image onto an optical disk, the recording method comprising steps of:
controlling, based on a number of still images on the optical disk, a decision as to whether or not to convert the data of the still image into moving image data when the optical disk is finalized;
converting the data of the still image into the moving image data in a same format as the data of the moving image when:
the optical disk is finalized; and
a decision of the controlling step is to convert the data of the still image into the moving image data when the optical disk is finalized; and recording the moving image data converted in the converting step onto the optical disk when the converting step converts the data of the still image into the moving image data wherein the decision of the controlling step to convert the data of the still image into the moving image data is independent of a decision to record the data of the moving image onto the optical disk, and wherein the controlling step comprises automatically controlling not to convert the data of the still image into the moving image data when the number of still images recorded on the optical disk, after completion of a last finalize process of the optical disk, is less than a predetermined number, wherein the last finalize process converted a different still image to the moving image data.

15. A non-transitory computer-readable medium encoded with program instructions, which, when executed by a processor, cause the processor to perform a method for recording data of a moving image and data of a still image onto an optical disk, the method comprising:

controlling, based a number of still images on the optical disk, a decision as to whether or not to convert the data of the still image into moving image data when the optical disk is finalized;

converting the data of the still image into the moving image data in a same format as the data of the moving image when:

the optical disk is finalized; and a decision of the controlling step is to convert the data of the still image into the moving image data when the optical disk is finalized; and recording the moving image data converted in the converting step onto the optical disk when the converting step converts the data of the still image into the moving image data wherein the decision of the controlling step to convert the data of the still image into the moving image data is independent of a decision to record the data of the moving image onto the optical disk, and wherein the controlling step comprises automatically controlling not to convert the data of the still image into the moving image data when the number of still images recorded on the optical disk, after completion of a last finalize process of the optical disk, is less than a predetermined number, wherein the last finalize process converted a different still image to the moving image data.

16. A recording apparatus for recording data of a moving image and data of a still image onto an optical disk, the recording apparatus comprising:

a controller that controls, based on a number of still images on the optical disk, a decision as to whether or not to convert the data of the still image into moving image data when the optical disk is finalized;

a converter that converts the data of the still image into the moving image data in a same format as the data of the moving image when:

the optical disk is finalized; and a decision of the controller is to convert the data of the still image into the moving image data when the optical disk is finalized; and a recorder that records the moving image data converted by the converter onto the optical disk when the converter converts the data of the still image into the moving image data wherein the decision of the controller to convert the data of the still image into the moving image data is independent of a decision to record the data of the moving image onto the optical disk, and wherein the controller automatically controls the converter not to convert the data of the still image into the moving image data when the number of still images recorded on the optical disk, after completion of a last finalize process of the optical disk, is less than a predetermined number, wherein the last finalize process converted a different still image to the moving image data.

* * * * *